(12) United States Patent
Tang et al.

(10) Patent No.: US 12,433,962 B2
(45) Date of Patent: Oct. 7, 2025

(54) PROBES FOR IMAGING B-AMYLOID AND INHIBITION OF β-AMYLOID AGGREGATION

(71) Applicant: The Hong Kong University of Science and Technology, Hong Kong (CN)

(72) Inventors: Benzhong Tang, Hong Kong (CN); Tianfu Zhang, Hong Kong (CN); Wing Yip Lam, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 527 days.

(21) Appl. No.: 18/049,670

(22) Filed: Oct. 26, 2022

(65) Prior Publication Data

US 2023/0133226 A1 May 4, 2023

Related U.S. Application Data

(60) Provisional application No. 63/274,945, filed on Nov. 3, 2021.

(51) Int. Cl.
| | | |
|---|---|---|
| *A61K 49/00* | (2006.01) | |
| *A61P 25/28* | (2006.01) | |
| *C07D 405/06* | (2006.01) | |
| *C07D 409/06* | (2006.01) | |
| *C07D 417/06* | (2006.01) | |
| *G01N 33/58* | (2006.01) | |
| *G01N 33/68* | (2006.01) | |

(52) U.S. Cl.
CPC .......... *A61K 49/0021* (2013.01); *A61P 25/28* (2018.01); *C07D 405/06* (2013.01); *C07D 409/06* (2013.01); *C07D 417/06* (2013.01); *G01N 33/582* (2013.01); *G01N 33/6896* (2013.01); *G01N 2333/4709* (2013.01); *G01N 2800/2821* (2013.01)

(58) Field of Classification Search
CPC .............................. G01N 33/533; G01N 33/53
USPC .......................................... 424/906; 436/501
See application file for complete search history.

(56) References Cited

U.S. PATENT DOCUMENTS

2008/0311675 A1* 12/2008 Thomas ............... G01N 33/582
530/402
2017/0137418 A1 5/2017 Thimmaiah et al.

FOREIGN PATENT DOCUMENTS

| CN | 109369632 A | 2/2019 |
|---|---|---|
| CN | 110684370 A | 1/2020 |
| CN | 111362927 A | 7/2020 |
| CN | 111574438 A | 8/2020 |
| CN | 111888486 A | 11/2020 |
| CN | 112552289 A | 3/2021 |
| CN | 108291874 B | 7/2021 |
| WO | 2008147805 A2 | 12/2008 |

OTHER PUBLICATIONS

Yuning Hong el. al., Monitoring and Inhibition of Insulin Fibrillation by a Small Organic Fluorogen with Aggregation-Induced Emission Characteristics, J. Am. Chem. Soc. 2012, 134, 1680-1689.
Wei Fu el. al., Rational Design of Near-Infrared Aggregation-Induced-Emission—Active Probes: In Situ Mapping of Amyloid β Plaques with Ultrasensitivity and High-Fidelity, J. Am. Chem. Soc. 2019, 141, 3171-3177.
Yunhua Zhang el. al., Chapter Four—Advances in fluorescent probes for detection and imaging of amyloid-β peptides in Alzheimer's disease, Advances in Clinical Chemistry, vol. 103, 2021, pp. 135-190.
Yaqi Tang el. al., An AIE-active theranostic probe for light-up detection of A β aggregates and protection of neuronal cells, Journal of Materials Chemistry B, vol. 7, 2019, 15, pp. 2434-2441.
First Office Action of Application No. or Patent No. 2022113236356 issued from the China National Intellectual Property Administration issued on Mar. 28, 2025.
Zengqiang Liang et. al., Simultaneous Detection of Human Serum Albumin and Sulfur Dioxide in Living Cells Based on a Catalyzed Michael Addition Reaction, Anal. Chem. 2020, 92, pp. 16130-16137.

* cited by examiner

*Primary Examiner* — Walter E Webb
(74) *Attorney, Agent, or Firm* — S&F/WEHRW

(57) ABSTRACT

Aggregation-induced emission luminogens useful for imaging β-amyloid peptide and aggregates thereof, pharmaceutical compositions comprising the same, and methods of use and preparation thereof.

20 Claims, 18 Drawing Sheets

PROBES FOR IMAGING B-AMYLOID AND INHIBITION OF β-AMYLOID AGGREGATION

CROSS-REFERENCE TO RELATED APPLICATIONS

The present application claims priority from U.S. Provisional Patent Application No. 63/274,945, filed on Nov. 3, 2021, which is hereby incorporated by reference in its entirety.

TECHNICAL FIELD

The present disclosure relates to probes with aggregation-induced emission characteristics that can be used to detect Aβ fibrils and inhibit the fibrillogenesis process of Aβ fibrils.

BACKGROUND

Alzheimer's disease (AD), leading to cognitive impairment and memory loss, has affected more than 50 million people in 2020 worldwide. AD is currently considered an incurable condition due to the complicated brain tissue and its microenvironment. Similar to protein fibrillogenesis, the formation and accumulation of amyloid-β (Aβ) species including soluble monomers, insoluble fibrils/aggregates, and plaques in the brain is thought to be a critical pathological hallmark for early diagnosis of AD and also play a central role in the neuropathology of AD. It is well known that Aβ peptides consist of 40 or 42 residues formed from the cleavage of amyloid precursor protein where the aggregation of monomeric Aβ peptides to insoluble plaque associated amyloid fibrils induces a cascade of biological events that subsequently lead to the death of neuronal cells. To date, none of the clinically tested drugs have shown significant effectiveness. Therefore, seeking effective therapeutics and imaging probes that are useful tools in drug development is highly desirable.

A series of extrinsic chemical fluorophores have been developed that can be used as imaging agents useful for visualizing and detecting Aβ fibrils. Examples of such chemical fluorophores include thioflavin T (ThT), Michler's hydrol blue, difluoroboron derivatives, rhodamine analogues, conjugated oligothiophenes, and semiconductor quantum dots. ThT has been a standard probe for amyloid assays for about half a century. Despite its widespread use, it suffers from several drawbacks, such as small Stokes shift, low specificity, poor sensitivity, false-positive response, poor reliability, and unsuitability for kinetic study. Owing to its intrinsic fluorescent intensity in dilute solution, it exhibits unavoidable background signal in aqueous solution, which becomes a barrier for high-fidelity imaging.

Besides imaging of Aβ fibrils and in vivo diagnosis of AD, a great deal of effort has been directed towards identifying external inhibitors for fibril formation. Targeting and inhibiting Aβ aggregation has been broadly recognized as an efficient therapeutic strategy for curing AD. Over the years, there have been numerous efforts to develop effective fibril inhibitors and β-sheet breakers that can prevent the aggregation of Aβ monomers into fibrils. For instance, scyllo cyclohexanehexol has been developed as an Aβ-aggregation inhibitor and is currently under phase II clinical trial. Polyphenols and antioxidants have also been reported to inhibit Aβ fibrillogenesis and some are currently under clinical trials.

Polymeric nanoparticles of various sizes and hydrophobicities have been used to adsorb the Aβ peptide onto the particle surface to control its fibrillogenesis kinetics. Some ligand-functionalized quantum dots are reported to quench both the nucleation and elongation of the Aβ peptide by blocking active sites on the seed fibrils or monomers. In addition to nanomaterials, transition-metal complexes have been utilized as potent inhibitors of Aβ aggregation by the formation of coordinative bonds with amino acid residues of the peptides. To be clinically useful, these inhibitors or b-breakers must also have blood-brain barrier (BBB) permeability, low neurotoxicity, and high in vivo stability. However, these crucial properties have yet to be demonstrated in these inhibitors or Aβ-breakers.

Small organic molecules, on the other hand, offer the potential to overcome the thorny difficulties encountered by the materials discussed above through rational structural design. Various organic inhibitors have been developed so far, most of which are derivatives of Aβ fibril-binding dyes such as ThT (FIG. 1). Recent advances in the area, however, have not provided the rational explanation for the mechanism of inhibitors, thus making the development of organic inhibitors remain a "black box".

In addition, many of these reported fluorophores mentioned above also contain electron donors and acceptors, between which intramolecular charge transfer occurs. Such fluorophores are sensitive to hydrophobicity of the environment, and their emissions are intensified upon binding to hydrophobic regions of amyloids rich in β-sheet structure. However, when multiple fluorophore molecules are accumulated in a hydrophobic patch of protein, π-π interaction between their stacked aromatic rings occurs, which promotes the distorted signals from enrichment quenching effect on fluorescence. In contrast, their intense emissions in dispersed states (diluted solution) unavoidably generate noise to form an always-on pattern.

There thus exists a need for improved chemical probes useful as imaging agents for Aβ fibrils.

SUMMARY

Fluorogens with "aggregation-induced emission" (AIE) characteristics, which are nonemissive when they are molecularly dissolved, but become highly luminescent when they are aggregated are ideally suited for the study of Aβ fibrillogenesis, for both of them are associated with aggregate formation. A water-miscible aggregation-induced emission (AIE) luminogens (AIEgens) described herein work as excellent Aβ probes, because (i) they are non-emissive in an aqueous buffer and thus the interference from background emission is minimal, (ii) their aromatic core can facilitate binding to the hydrophobic surface of Aβ fibril aggregates, hence activating the restriction of intramolecular rotation (RIR) process and switching on its light emission, and (iii) its emission intensity may be increased to varying extents in the nucleation, elongation, and equilibrium phases, thereby enabling the evaluation of amyloidogenesis kinetics.

Provided herein are amphiphilic near-infrared (NIR) AIE luminogens (AIEgens). Based on the alteration of hydrophobic electron-donating moiety and hydrophilic electron-withdrawing groups for the specific Aβ detection. By modulating the aggregation behaviors, the AIEgens are shown to light up Aβ plaques with high sensitivity, signal-to-noise ratio, and exhibited efficient BBB penetrability. The AIEgens are also shown to affect the Aβ fibrillogenesis by inhibiting the aggregation of Aβ peptides and dissociation of the Aβ fibrils, thus preventing fibril growth. DFT and molecular docking calculations showed that the compounds possess large hydrophobic surface areas, which may undergo strong contacts with specific residues of Aβ peptides. Additionally, the hydrophilic portions of the AIEgens can stabilize Aβ through π-π and electrostatic interactions. These multiple interactions significantly improve the ability of the AIEgens described herein to prevent Aβ oligomerization and fibril formation as well as reduce Aβ-induced cytotoxicity. The in vivo therapeutic study verified that AIEgens can rescue memory deficits of APP/PS1 double transgenic AD mice model without obvious toxicity.

In a first aspect, provided herein is an aggregation-induced emission luminogen (AIEgen) having a Formula 1:

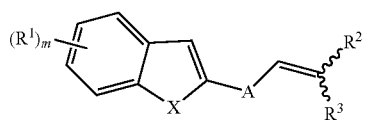

or a pharmaceutically acceptable salt thereof, wherein:
m is a whole number selected from 1-4;
n for each instance is a whole number selected from 1-6;
p is a whole number selected from 1-4;
q is a whole number selected from 2-6;
A is a bond or a moiety having the structure:

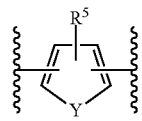

Y is O, S, or —$NR^6$—;
X is —O(C=O)— or —$(R^4)C$=$C(R^4)$—;
$R^1$ for each instance is independently hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^2$ is a moiety having structure:

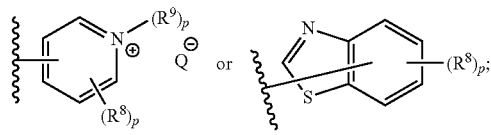

$R^3$ is hydrogen or cyano;
$R^3$ for each instance is independently hydrogen, alkyl, cycloalkyl, alkenyl, alkynyl, aryl, aralkyl, heterocycloalkyl, or heteroaryl;
$R^5$ is hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^6$ is hydrogen, alkyl, cycloalkyl, alkenyl, alkynyl, aryl, aralkyl, heterocycloalkyl, or heteroaryl;
$R^7$ for each occurrence is independently hydrogen, alkyl, cycloalkyl, alkenyl, alkynyl, aryl, aralkyl, heterocycloalkyl, heteroaryl, or —$(CH_2)_nZ$; or two instances of $R^7$ taken together with the atom or atoms to which they are covalently bonded form a 3-7 membered cycloalkyl, or 3-7 membered heterocycloalkyl;
$R^8$ for each instance is independently hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^9$ is alkyl, cycloalkyl, alkenyl, alkynyl, aryl, aralkyl, heterocycloalkyl, heteroaryl, —$(CH_2)_qOH$, or —$(CH_2)_qNH_2$; Q is an anion; and
Z for each instance is independently halide, —C≡CH, —$N_3$, —NCS, —NCO, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, or N-maleimide.

In certain embodiments, each of m and t is independently 1 or 2.

In certain embodiments, Y is O or S; and each $R^4$ is hydrogen.

In certain embodiments, A is a bond or a moiety having the structure:

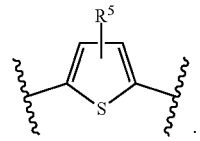

In certain embodiments, m is 1; and $R^1$ is —$OR^7$, —$SR^7$, or —$N(R^7)_2$, wherein $R^7$ for each instance is independently hydrogen, alkyl, cycloalkyl, alkenyl, alkynyl, aryl, aralkyl, heterocycloalkyl, heteroaryl, or —$(CH_2)_nOH$; or two instances of $R^7$ taken together with the nitrogen to which they are covalently bonded form 3-7 membered heterocycloalkyl.

In certain embodiments, $R^2$ is a moiety having structure:

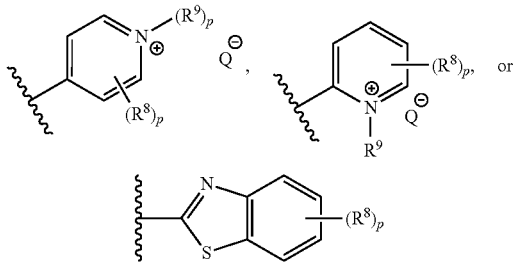

wherein p is 1.

In certain embodiments, the AIEgen is represented by the Formula 2:

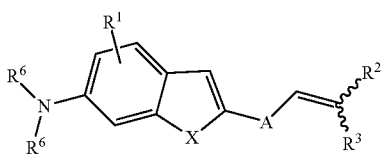

or a pharmaceutically acceptable salt thereof, wherein:
n for each instance is a whole number selected from 1-6;
q is a whole number selected from 2-6;
X is —O(C=O)— or —(H)C=C(H)—;
A is a bond or a moiety having the structure:

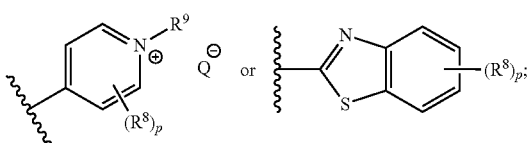

$R^1$ for each instance is independently hydrogen, halide, cyano, nitro, alkyl, cycloalkyl, alkenyl, alkynyl, aryl, aralkyl, heterocycloalkyl, heteroaryl, or —(CH$_2$)$_n$Z;
$R^2$ is a moiety having structure:

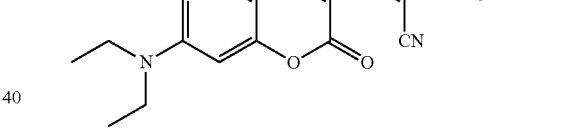

$R^3$ is hydrogen or cyano;
$R^5$ is hydrogen, halide, cyano, nitro, alkyl, cycloalkyl, alkenyl, alkynyl, aryl, aralkyl, heterocycloalkyl, heteroaryl, or —(CH$_2$)$_n$Z;
$R^7$ for each occurrence is independently hydrogen, alkyl, cycloalkyl, alkenyl, alkynyl, aryl, aralkyl, heterocycloalkyl, heteroaryl, or —(CH$_2$)$_n$Z; or two instances of $R^7$ taken together with the nitrogen to which they are covalently bonded form a 3-7 membered heterocycloalkyl;
$R^8$ is hydrogen, halide, cyano, nitro, alkyl, cycloalkyl, alkenyl, alkynyl, aryl, aralkyl, heterocycloalkyl, heteroaryl, or —(CH$_2$)$_n$Z;
$R^9$ is alkyl, cycloalkyl, alkenyl, alkynyl, aryl, aralkyl, heterocycloalkyl, heteroaryl, —(CH$_2$)$_q$OH, or —(CH$_2$)$_q$NH$_2$; and Q is an anion.

In certain embodiments, each of $R^1$, $R^5$, and $R^8$ is hydrogen.

In certain embodiments, $R^7$ for each occurrence is independently hydrogen, alkyl, or —(CH$_2$)$_n$OH; or two instances of $R^7$ taken together with the nitrogen to which they are covalently bonded form a 3-6 membered heterocycloalkyl.

In certain embodiments, $R^9$ is —(CH$_2$)$_q$OH or —(CH$_2$)$_q$NH$_2$

In certain embodiments, the AIEgen is selected from the group consisting of:

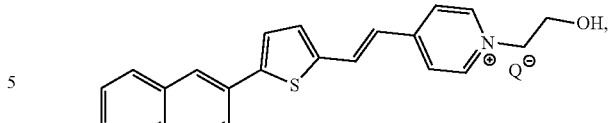

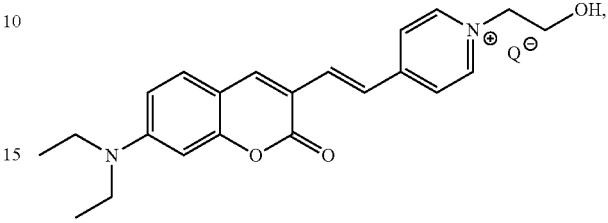

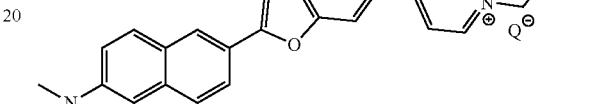

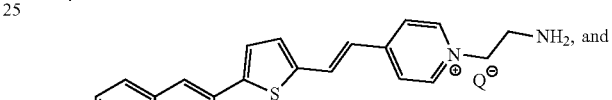

or a pharmaceutically acceptable salt thereof, wherein Q is an anion.

In a second aspect, provided herein is a pharmaceutical composition comprising an AIEgen described herein and at least one pharmaceutically acceptable excipient or carrier.

In a third aspect, provided herein is a method comprising: contacting a compound having Formula 6:

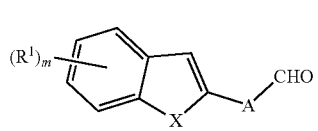

wherein:
m is a whole number selected from 1-4;
n for each instance is a whole number selected from 1-6;
A is a bond or a moiety having the structure:

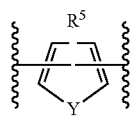

Y is O, S, or —NR⁶—;

X is —O(C═O)— or —(R⁴)C═C(R⁴)—;

R¹ for each instance is independently hydrogen, halide, cyano, nitro, —OR⁷, —SR⁷, —N(R⁷)₂, —(C═O)R⁷, —(C═O)OR⁷, —(C═O)N(R⁷)₂, —N(R⁷)(C═O)R⁷, —O(C═O)R⁷, —N(R⁷)(C═O)OR⁷, —O(C═O)N(R⁷)₂, —SO₂R⁷, —SO₂N(R⁷)₂, alkyl, cycloalkyl, alkenyl, alkynyl, aryl, aralkyl, heterocycloalkyl, heteroaryl, or —(CH₂)ₙZ;

R⁴ for each instance is independently hydrogen, alkyl, cycloalkyl, alkenyl, alkynyl, aryl, aralkyl, heterocycloalkyl, or heteroaryl;

R⁵ is hydrogen, halide, cyano, nitro, —OR⁷, —SR⁷, —N(R⁷)₂, —(C═O)R⁷, —(C═O)OR⁷, —(C═O)N(R⁷)₂, —N(R⁷)(C═O)R⁷, —O(C═O)R⁷, —N(R⁷)(C═O)OR⁷, —O(C═O)N(R⁷)₂, —SO₂R⁷, —SO₂N(R⁷)₂, alkyl, cycloalkyl, alkenyl, alkynyl, aryl, aralkyl, heterocycloalkyl, heteroaryl, or —(CH₂)ₙZ;

R⁶ is hydrogen, alkyl, cycloalkyl, alkenyl, alkynyl, aryl, aralkyl, heterocycloalkyl, or heteroaryl;

R⁷ for each occurrence is independently hydrogen, alkyl, cycloalkyl, alkenyl, alkynyl, aryl, aralkyl, heterocycloalkyl, heteroaryl, or —(CH₂)ₙZ; or two instances of R⁷ taken together with the atom or atoms to which they are covalently bonded form a 3-7 membered cycloalkyl, or 3-7 membered heterocycloalkyl; and Z for each instance is independently halide, —C≡CH, —N₃, —NCS, —NCO, —OR⁶, —SR⁶, —N(R⁶)₂, —(C═O)R⁶, —(C═O)OR⁶, —(C═O)N(R⁶)₂, —N(R⁶)(C═O)R⁶, —O(C═O)R⁶, —N(R⁶)(C═O)OR⁶, —O(C═O)N(R⁶)₂, —SO₂R⁶, —SO₂N(R⁶)₂, or N-maleimide;

with a secondary amine and a compound of Formula 7a, 7b, or 7c:

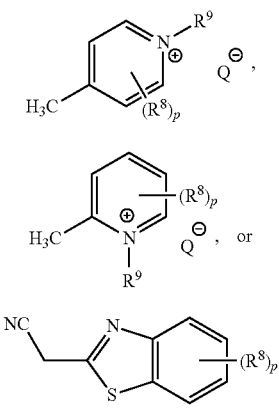

or a conjugate base thereof, wherein p is a whole number selected from 1-4;

R⁸ for each instance is independently hydrogen, halide, cyano, nitro, —OR⁷, —SR⁷, —N(R⁷)₂, —(C═O)R⁷, —(C═O)OR⁷, —(C═O)N(R⁷)₂, —N(R⁷)(C═O)R⁷, —O(C═O)R⁷, —N(R⁷)(C═O)OR⁷, —O(C═O)N (R⁷)₂, —SO₂R⁷, —SO₂N(R⁷)₂, alkyl, cycloalkyl, alkenyl, alkynyl, aryl, aralkyl, heterocycloalkyl, heteroaryl, or —(CH₂)ₙZ;

R⁹ is alkyl, cycloalkyl, alkenyl, alkynyl, aryl, aralkyl, heterocycloalkyl, heteroaryl, —(CH₂)qOH, or —(CH₂)qNH₂; and Q is an anion;

thereby forming the AIEgen having Formula 1.

In a fourth aspect, provided herein is a method of imaging a β-amyloid peptide, the method comprising contacting the β-amyloid peptide with an AIEgen described herein; irradiating the AIEgen with electromagnetic radiation; and detecting luminescence from the AIEgen.

In certain embodiments, the β-amyloid protein comprises Aβ₄₂.

In certain embodiments, the method is conducted in vivo or ex vivo.

In certain embodiments, the AIEgen exhibits $\lambda_{em}$ emission wavelength maximum between 690-705 nm.

In certain embodiments, the AIEgen exhibits a signal-to-noise ratio (S/N) of 10-15-fold.

In a fifth aspect, provided herein is a method of at least partially inhibiting Aβ fibrillogenesis the method comprising contacting Aβ peptides with an AIEgen described herein thereby at least partially inhibiting Aβ fibrillogenesis.

In a sixth aspect, provided herein is a method of treating Alzheimer's disease in a subject in need thereof, the method comprising: administering a therapeutically effective amount of an AIEgen described herein to the subject.

BRIEF DESCRIPTION OF THE FIGURES

The appended drawings, where like reference numerals refer to identical or functionally similar elements, contain figures of certain embodiments to further illustrate and clarify the above and other aspects, advantages and features of the present disclosure. It will be appreciated that these drawings depict exemplary embodiments of the invention and as such are not intended to limit its scope. The invention will be described and explained with additional specificity and detail through the use of the accompanying drawings.

Ultrahigh S/N ratio of DNTPH toward Aβ$_{42}$ aggregates compared to the background signals in PBS and that towards BSA.

Figure 5:
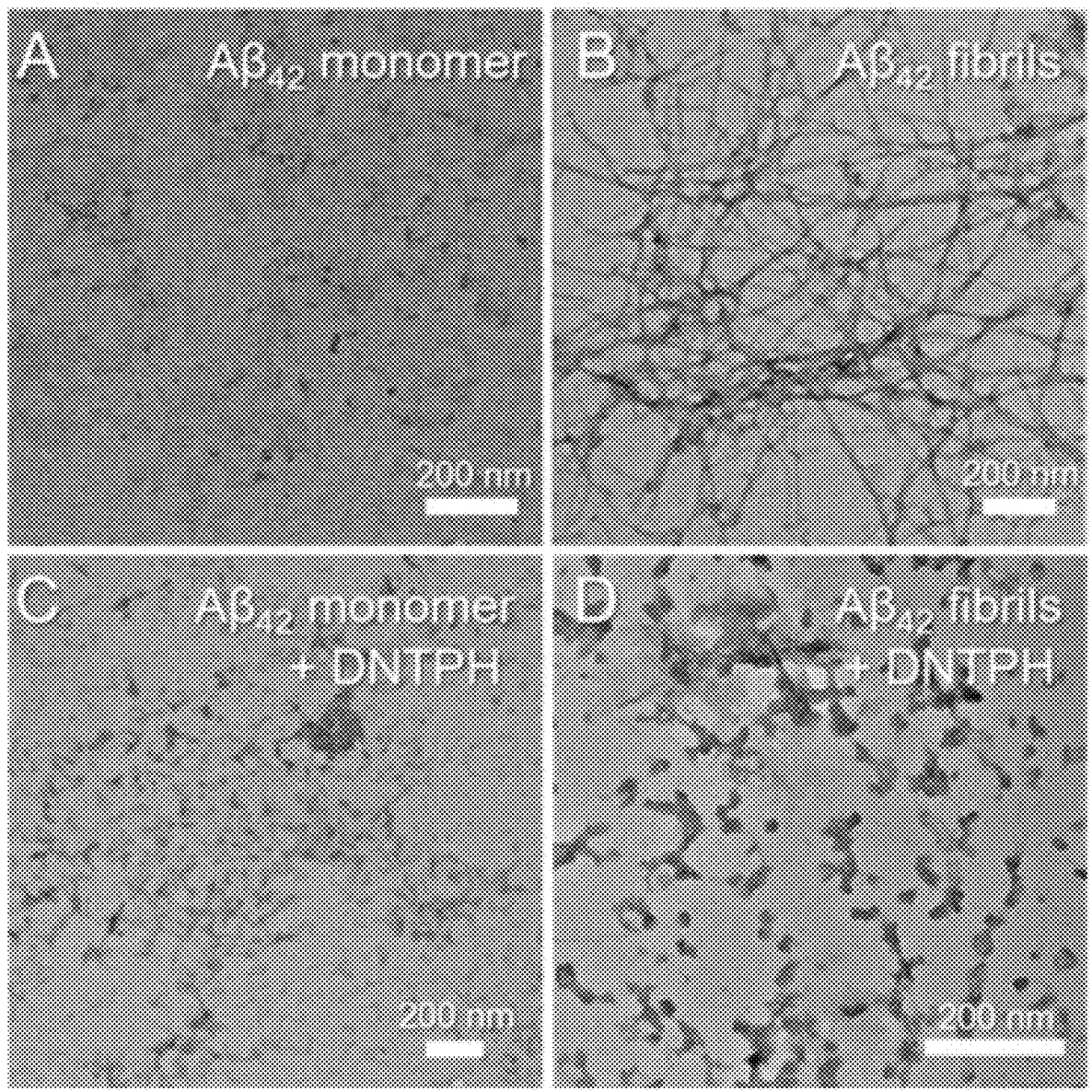
Figure 5:
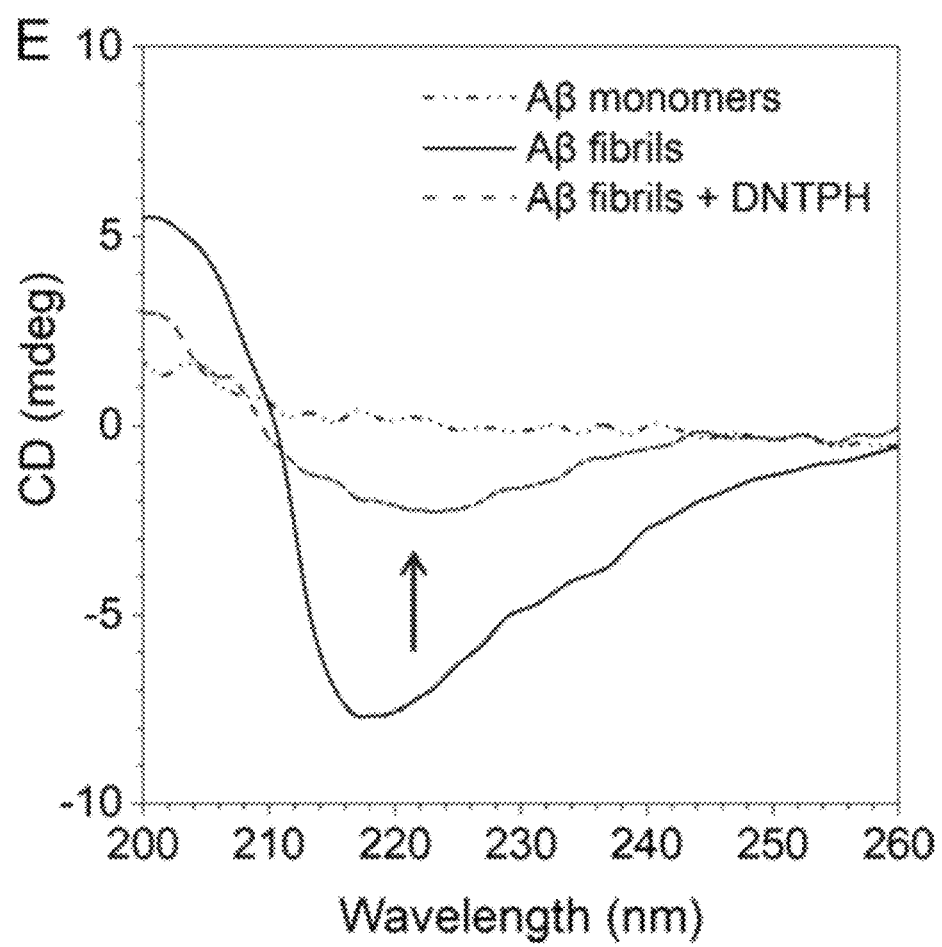

FIG. 5 depicts TEM images of (A) Aβ$_{42}$ Monomer, (B) Aβ$_{42}$ fibrils grown in the absence of DNTPH after 24 h incubation at 37° C. in PBS, (C) Aβ$_{42}$ Monomer+DNTPH, and (D) Aβ$_{42}$ fibrils grown in the presence of DNTPH after 24 h incubation at 37° C. in PBS. (E) CD spectra of Aβ$_{42}$ monomer and fibrils with or without co-incubation of DNTPH for 48 h at 37° C. in PBS.

Figure 6:
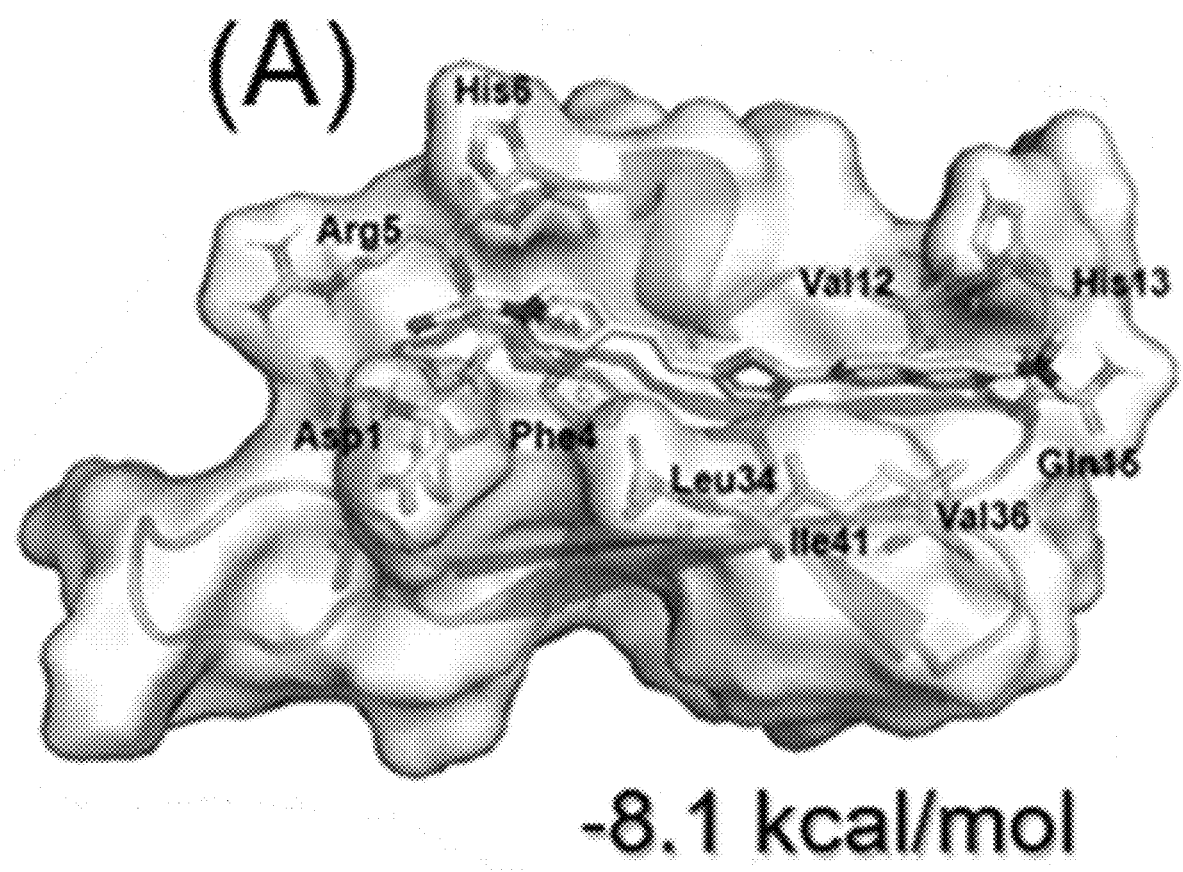
Figure 6:
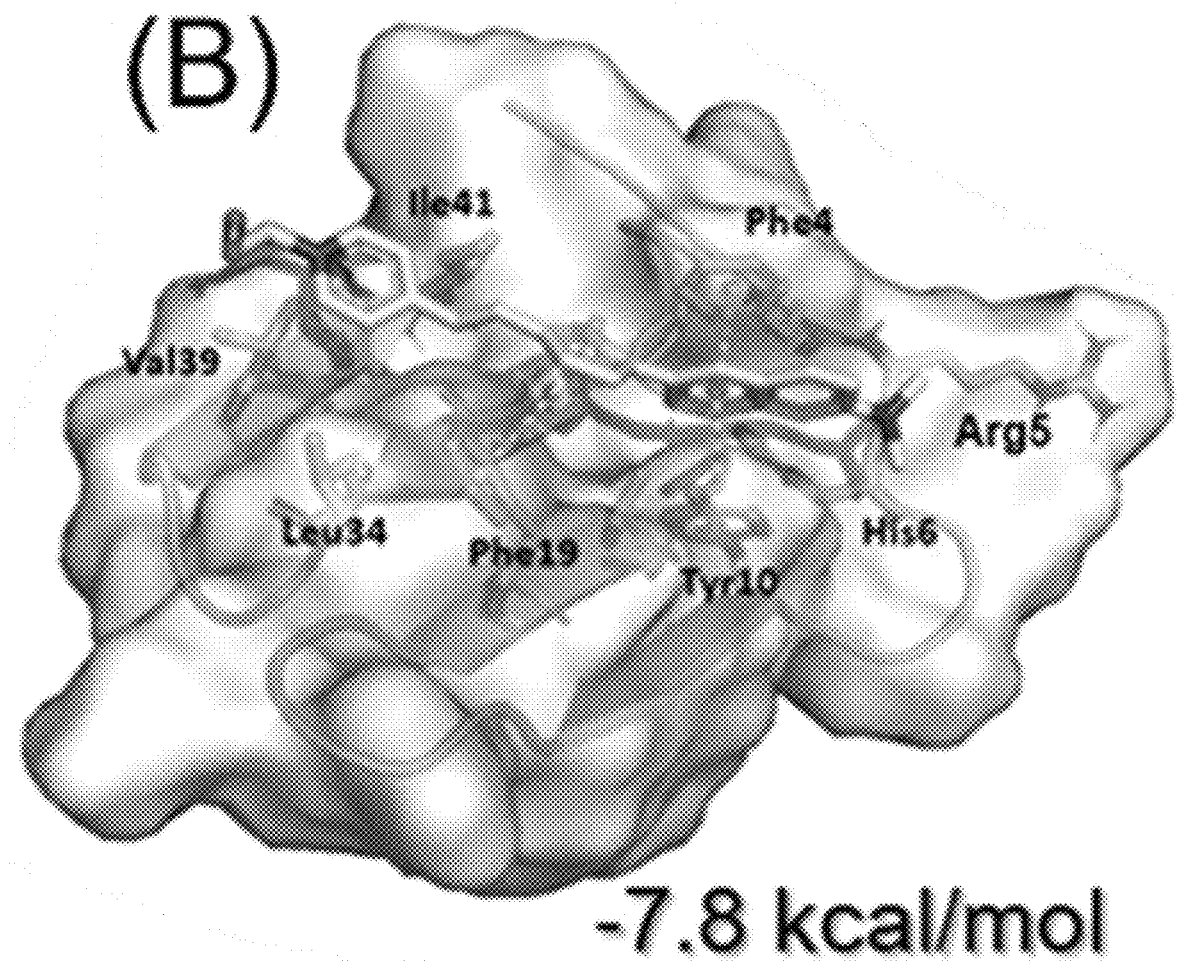
Figure 6:
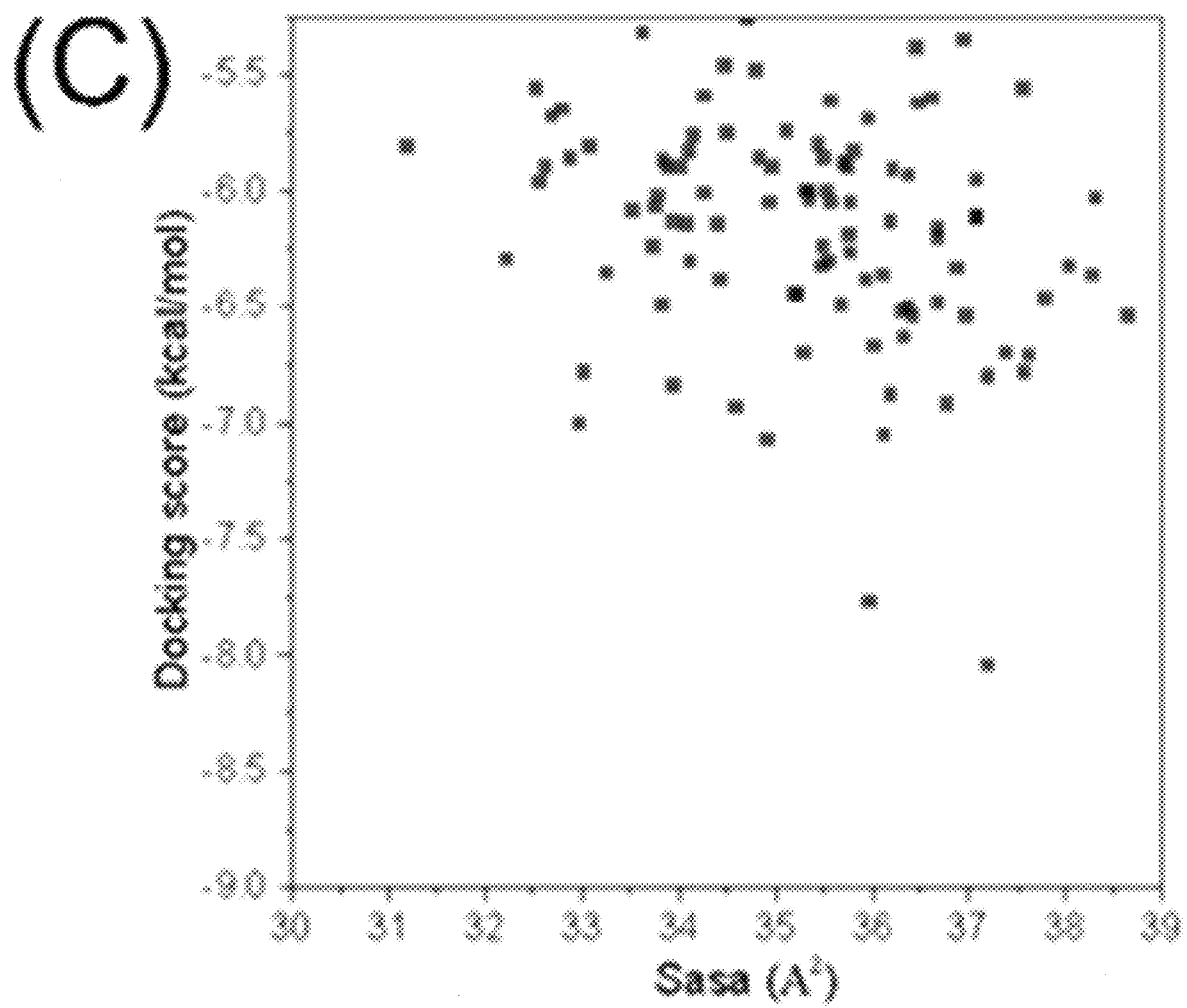
Figure 6:
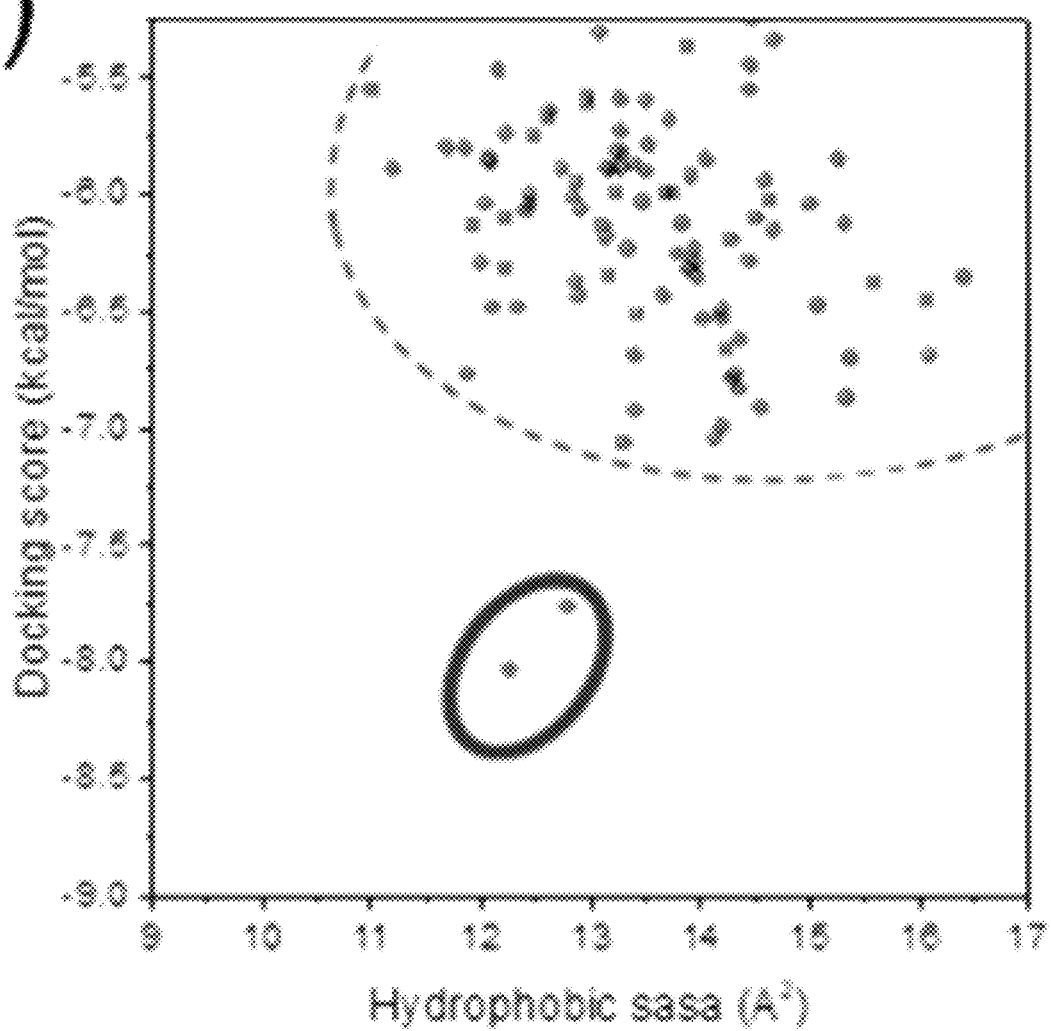

FIG. 6 depicts view of two consecutive Aβ$_{42}$ fibrils. (A), (B) The two best docking poses with the lowest binding free energies (E; kcal/mol). (C), (D) Plot of the surface area and hydrophobic surface area of DNTPH exposed to solvent versus the docking score upon its docking to Aβ$_{42}$. With a more concise choice of hydrophobic surface area, the docking score (in terms of energy) is lowered and more compact, indicating better docking with DNTPH embedded in Aβ$_{42}$.

Figure 7:
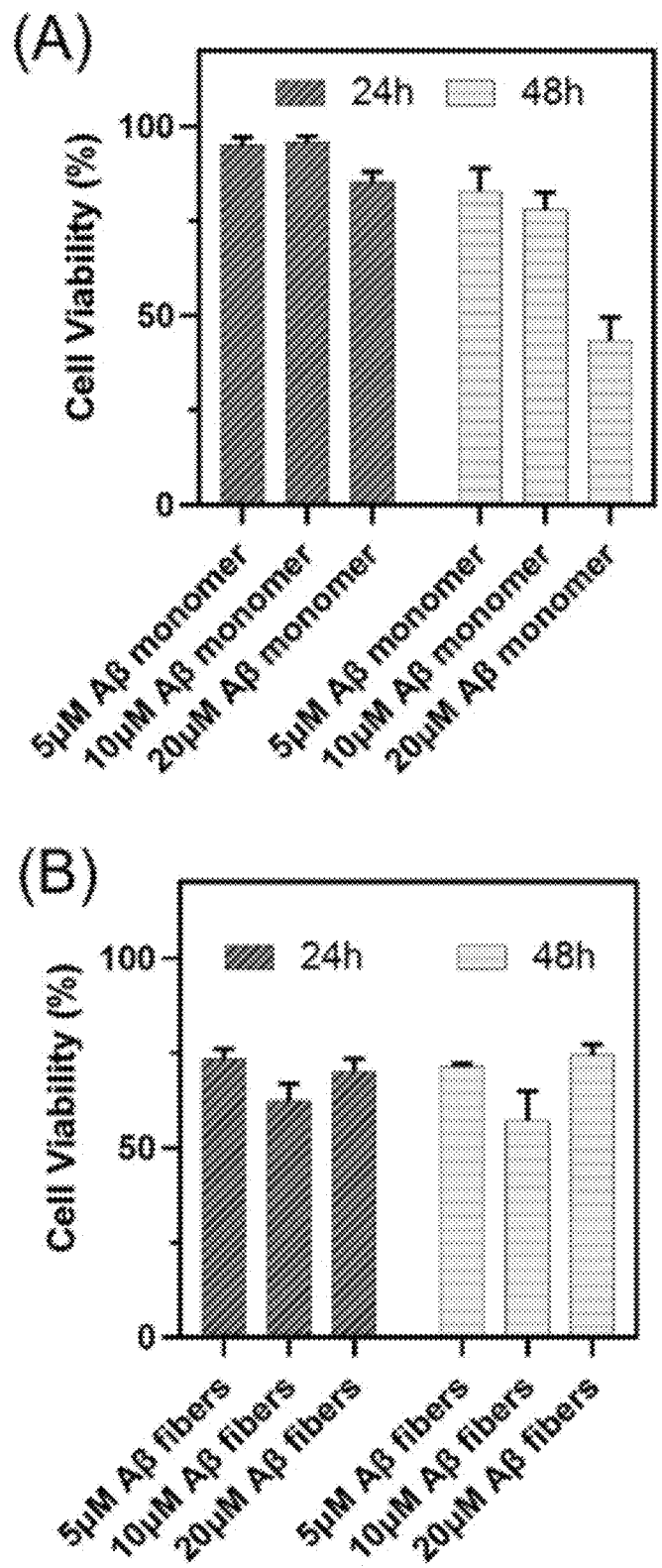
Figure 7:
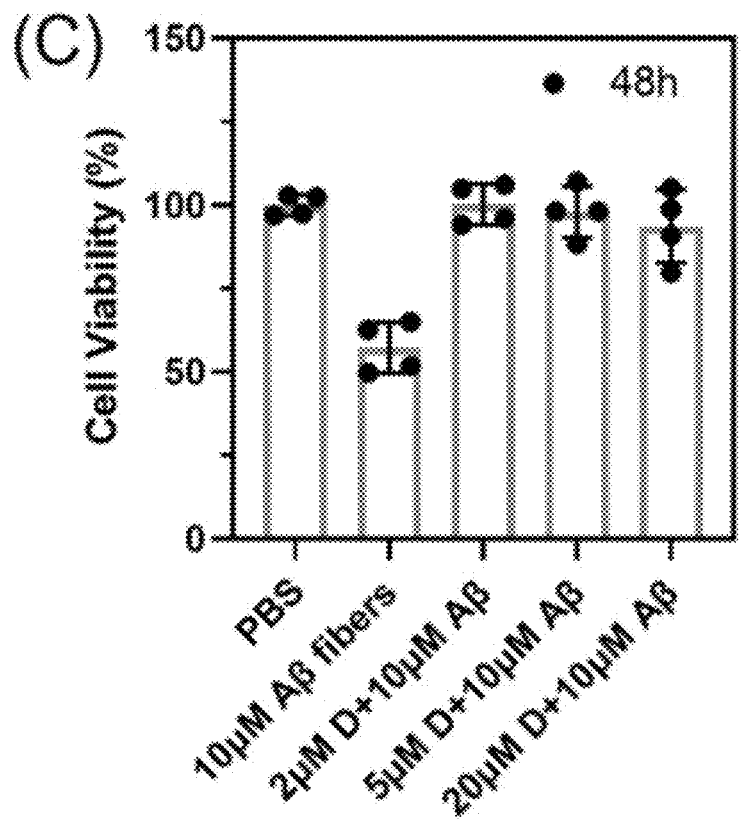
Figure 7:
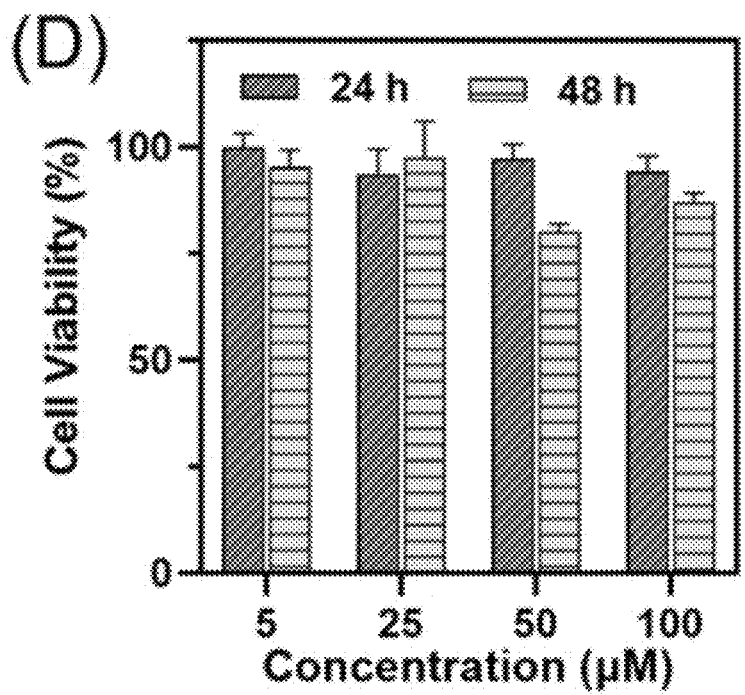

FIG. 7 depicts (A) Cytotoxicity towards human neuroblastoma PC-12 cells of Aβ monomer under 24 h and 48 h incubation. (B) Cytotoxicity of Aβ fibrils under 24 h and 48 h incubation. (C) Neuroprotective effects of DNTPH against Aβ fibrils induced cytotoxicity at the ratio [DNTPH]:[Aβ] of 2:1, 1:2 and 1:5. (D) Cell viability of different concentrations of DNTPH towards PC-12 cells under 24 h and 48 h incubation.

Figure 8:
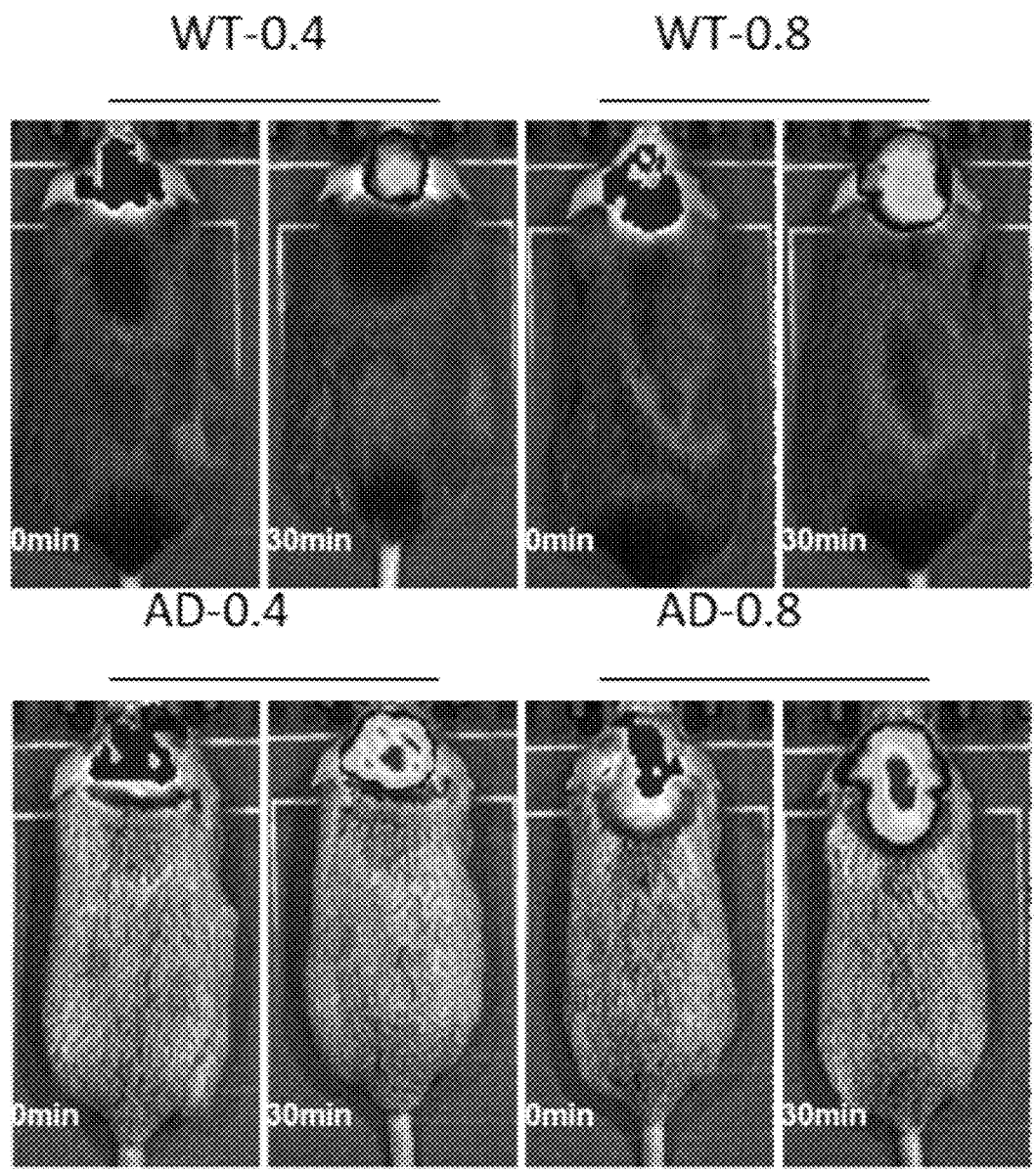

FIG. 8 depicts in vivo mapping of Aβ deposition in early-stage AD model (APP/PS1 transgenic) mice with 6 months. Comparison of the fluorescent image at 30 min after intravenous injection of 0.4 or 0.8 mg kg$^{-1}$ of DNTPH into wild-type mice and APP/PS1 mice, n=3.

Figure 9:
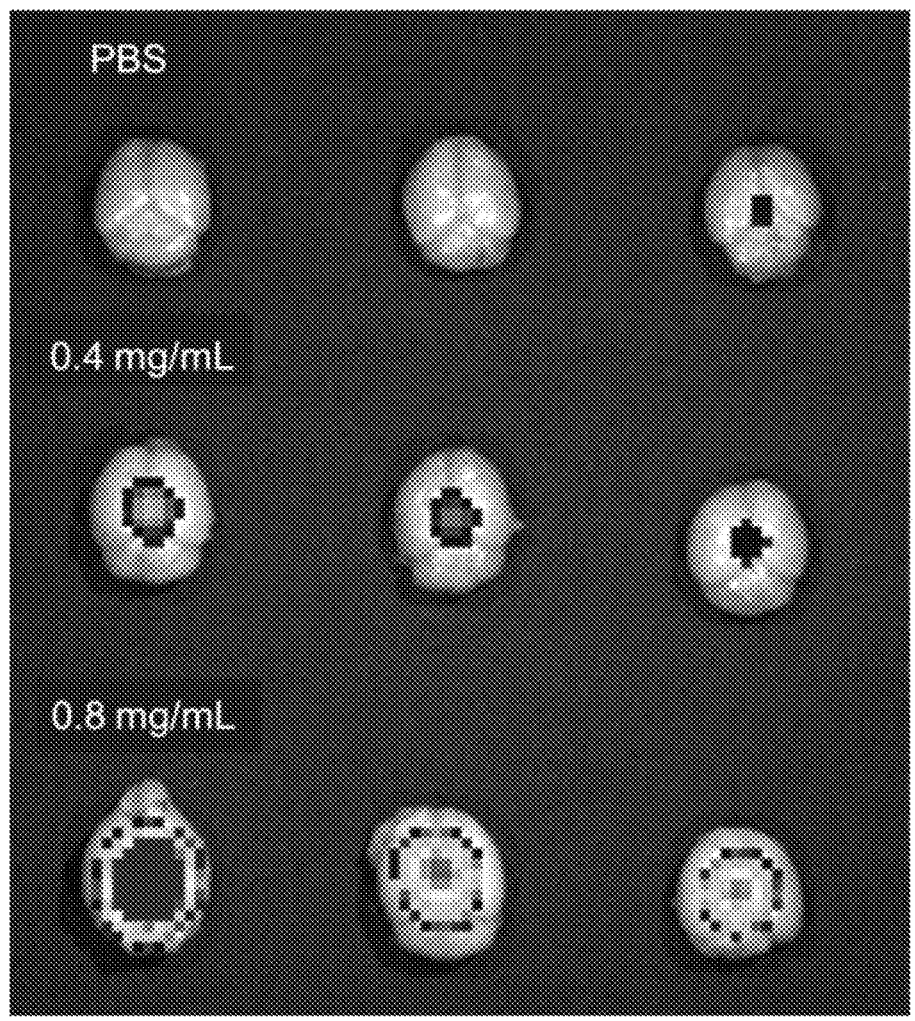

FIG. 9 depicts ex vivo fluorescent images of mouse brains fluorescent images of brains removed from APP/PS1 and normal mice 30 min after intravenous injection of DNTPH. The fluorescent images were obtained using an orange filter at an excitation of 490 nm.

Figure 10:
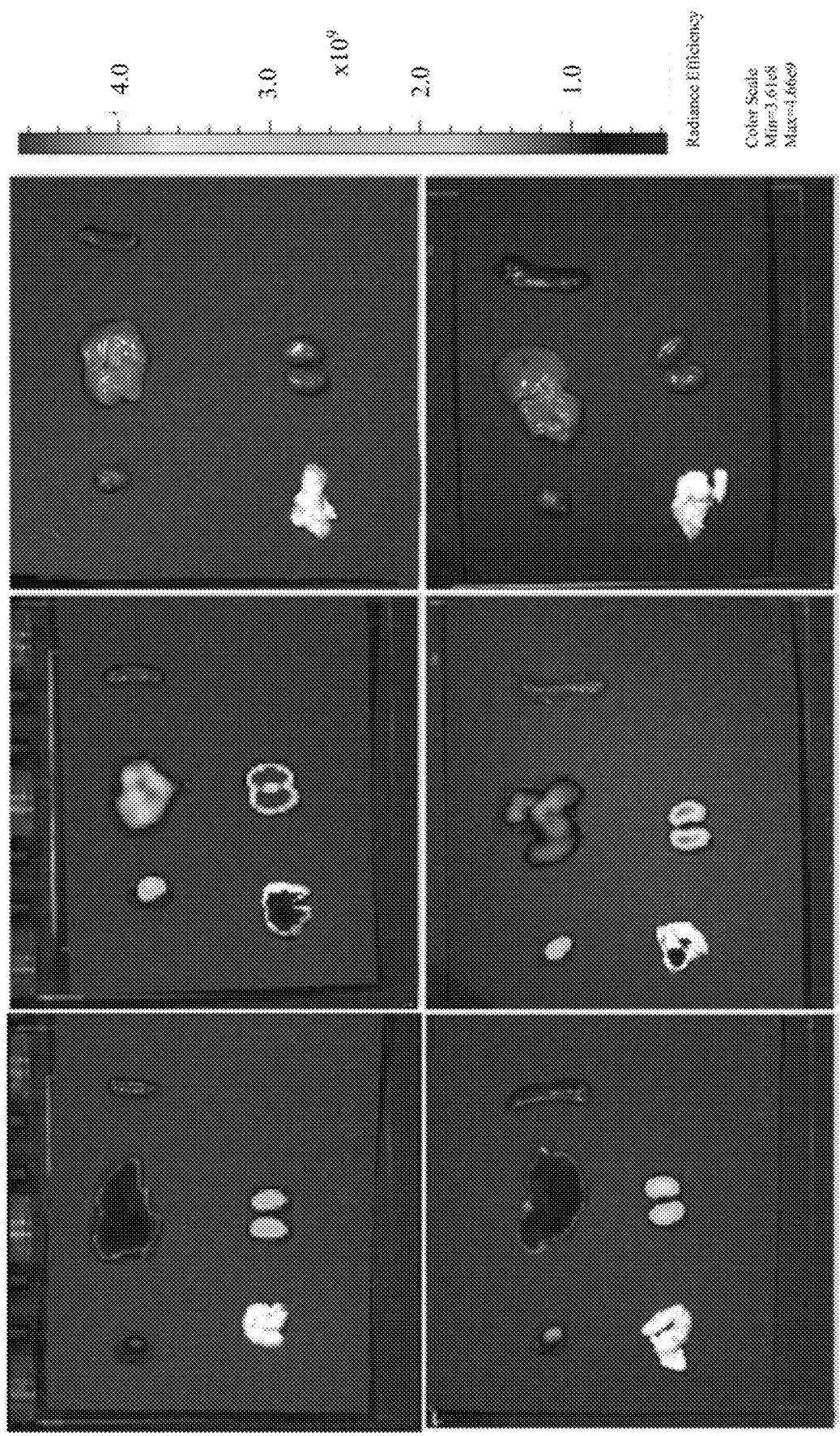

FIG. 10 depicts ex vivo fluorescent images of mouse organs. Fluorescent images of organs removed from APP/PS1 and normal mice 30 min after intravenous injection of DNTPH. The fluorescent images were obtained using an orange filter at an excitation of 490 nm.

DETAILED DESCRIPTION

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

It should be understood that the order of steps or order for performing certain actions is immaterial so long as the present teachings remain operable. Moreover, two or more steps or actions may be conducted simultaneously.

As used herein, "halo", "halide", or "halogen" refers to fluoro, chloro, bromo, and iodo.

As used herein, "alkyl" refers to a straight-chain or branched saturated hydrocarbon group. Examples of alkyl groups include methyl-, ethyl-, propyl (e.g., n-propyl and isopropyl), butyl (e.g., n-butyl, iso-butyl, sec-butyl, tert-butyl), pentyl groups (e.g., 1-methylbutyl, 2-methylbutyl, iso-pentyl, tert-pentyl, 1,2-dimethylpropyl, neopentyl, and 1-ethylpropyl), hexyl groups, and the like. In various embodiments, an alkyl group can have 1 to 40 carbon atoms (i.e., $C_1$-$C_{40}$ alkyl group), for example, 1-30 carbon atoms (i.e., $C_1$-$C_{30}$ alkyl group). In certain embodiments, an alkyl group can have 1 to 6 carbon atoms, and can be referred to as a "lower alkyl group." Examples of lower alkyl groups include methyl, ethyl, propyl (e.g., n-propyl and isopropyl), and butyl groups (e.g., n-butyl, isobutyl, sec-butyl, tert-butyl). In certain embodiments, alkyl groups can be optionally substituted as described herein. An alkyl group is generally not substituted with another alkyl group, an alkenyl group, or an alkynyl group.

The term "aralkyl" is art-recognized and refers to an alkyl group substituted with an aryl group (e.g., an aromatic or heteroaromatic group).

As used herein, "cycloalkyl" by itself or as part of another substituent means, unless otherwise stated, a monocyclic hydrocarbon having between 3-12 carbon atoms in the ring system and includes hydrogen, straight chain, branched chain, and/or cyclic substituents. Exemplary cycloalkyls include cyclopropyl, cyclobutyl, cyclopentyl, cyclohexyl, cycloheptyl, and the like.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., $C_2$-$C_{40}$ alkenyl group), for example, 2 to 20 carbon atoms (i.e., $C_2$-$C_{20}$ alkenyl group). In some embodiments, alkenyl groups can be substituted as described herein. An alkenyl group is generally not substituted with another alkenyl group, an alkyl group, or an alkynyl group.

As used herein, a "fused ring" or a "fused ring moiety" refers to a polycyclic ring system having at least two rings where at least one of the rings is aromatic and such aromatic ring (carbocyclic or heterocyclic) has a bond in common with at least one other ring that can be aromatic or non-aromatic, and carbocyclic or heterocyclic. These polycyclic ring systems can be highly p-conjugated and optionally substituted as described herein.

As used herein, "heteroatom" refers to an atom of any element other than carbon or hydrogen and includes, for example, nitrogen, oxygen, silicon, sulfur, phosphorus, and selenium.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., $C_6$-$C_{24}$ aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be optionally substituted as described herein. The aryl ring may be substituted at one or more positions with such substituents as described herein, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl." In certain embodiments, an aryl group is substituted with another aryl group and can be referred to as a biaryl group. Each of the aryl groups in the biaryl group can be optionally substituted as disclosed herein.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S—O bonds. However, one or more N or S atoms in a heteroaryl group can be oxidized (e.g., pyridine N-oxide thiophene S-oxide, thiophene S,S-dioxide). Examples of heteroaryl groups include, for example, the 5- or 6-membered monocyclic and 5-6 bicyclic ring systems shown below: where T is O, S, NH, N-alkyl, N-aryl, N-(arylalkyl)(e.g., N-benzyl), $SiH_2$, SiH(alkyl), Si(alkyl)$_2$, SiH(arylalkyl), Si(arylalkyl)$_2$, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be optionally substituted as described herein. The heterocyclic ring may be substituted at one or more positions with such substituents as described herein, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "optionally substituted" refers to a chemical group, such as alkyl, cycloalkyl, aryl, heteroaryl, and the like, wherein one or more hydrogen may be replaced with a with a substituent as described herein, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like The representation "⁂" as used herein in connection to chemical a group or moiety is intended to represent the covalent bond that the aforementioned chemical group or moiety is covalently bonded to another chemical group or moiety.

As used herein, the term pharmaceutically acceptable salt refers to any salt of the compound of this invention which retains its biological properties and which is not toxic or otherwise undesirable for pharmaceutical use. Such salts may be derived from a variety of organic and inorganic counterions well known in the art and include them. Such salts include: (1) acid addition salts formed with organic or inorganic acids such as hydrochloric, hydrobromic, sulfuric, nitric, phosphoric, sulfamic, acetic, trifluoroacetic, trichloroacetic, prop ionic, hexanoic, cyclopentylpropionic, glycolic, glutaric, pyruvic, lactic, malonic, succinic, sorbic, ascorbic, malic, maleic, fumaric, tartaric, citric, benzoic, 3-(4-hydroxybenzoyl)benzoic, picric, cinnamic, mandelic, phthalic, lauric, methanesulfonic, ethanesulfonic, 1,2-ethane-disulfonic, 2-hydroxyethanesulfonic, benzenesulfonic, 4-chlorobenzenesulfonic, 2-naphthalenesulfonic, 4-toluenesulfonic, camphoric, camphorsulfonic, 4-methylbicyclo [2.2.2]-oct-2-ene-1-carboxylic, glucoheptonic, 3-phenylpropionic, trimethylacetic, tert-butylacetic, lauryl sulfuric, gluconic, benzoic, glutamic, hydroxynaphthoic, salicylic, stearic, cyclohexylsulfamic, quinic, muconic acid and the like acids; or (2) salts formed when an acidic proton present in the parent compound either (a) is replaced by a metal ion (e.g., an alkali metal ion, an alkaline earth ion or an aluminum ion), or alkali metal or alkaline earth metal hydroxides (e.g., sodium, potassium, calcium, magnesium, aluminum, lithium, zinc, and barium hydroxide), ammonia or (b) coordinates with an organic base, such as aliphatic, alicyclic, or aromatic organic amines, such as ammonia, methylamine, dimethylamine, diethylamine, picoline, ethanolamine, diethanolamine, triethanolamine, ethylenediamine, lysine, arginine, ornithine, choline, N,N'-dibenzylethylene-diamine, chloroprocaine, diethanolamine, procaine, N-benzylphenethylamine, N-methylglucamine piperazine, tris(hydroxymethyl)-aminomethane, tetramethylammonium hydroxide, and the like. In addition, examples of salts include sodium, potassium, calcium, magnesium, ammonium, tetraalkylammonium and the like, and when the compound contains a basic functionality, salts of non-toxic organic or inorganic acids, such as hydrohalides (e.g., hydrochloride and hydrobromide), sulfate, phosphate, sulfamate, nitrate, acetate, trifluoroacetate, trichloroacetate, propionate, hexanoate, cyclopentylpropionate, glycolate, glutarate, pyruvate, lactate, malonate, succinate, sorbate, ascorbate, malate, maleate; fumarate, tartarate, citrate, benzoate, 3-(4-hydroxybenzoyl)benzoate, picrate, cinnamate, mandelate, phthalate, laurate, methanesulfonate (mesylate), ethanesulfonate, 1,2-ethane-disulfonate, 2-hydroxyethanesulfonate, benzenesulfonate (besylate), 4-chlorobenzenesulfonate, 2-naphthalenesulfonate, 4-toluenesulfonate, camphorate, camphorsulfonate, 4-methylbicyclo[2.2.2]-oct-2-ene-1-carboxylate, glucoheptonate, 3-phenylpropionate, trimethylacetate, tert-butylacetate, lauryl sulfate, gluconate, benzoate, glutamate, hydroxynaphthoate, salicylate, stearate, cyclohexylsulfamate, quinate, muconate and the like.

The phrase "aggregation-induced emission" or "AIE" as used herein refers to the enhancement of light-emission by a fluorescent compound upon aggregation in the amorphous or crystalline (solid) states of the fluorescent compound, whereas the fluorescent compound exhibits weak or substantially no emission in dilute solutions.

The term "$\lambda_{ex}$" as used herein refers to the excitation wavelength.

The term "$\lambda_{em}$" as used herein refers to the emission wavelength.

As used herein by a "subject" is meant an individual. Thus, the "subject" can include domesticated animals (e.g., cats, dogs, etc.), livestock (e.g., cattle, horses, pigs, sheep, goats, etc.), laboratory animals (e.g., mouse, rabbit, rat, guinea pig, etc.), and birds. "Subject" can also include a mammal, such as a primate or a human.

By "prevent" or other forms of the word, such as "preventing" or "prevention," is meant to stop a particular event or characteristic, to stabilize or delay the development or progression of a particular event or characteristic, or to minimize the chances that a particular event or characteristic will occur. Prevent does not require comparison to a control as it is typically more absolute than, for example, reduce. As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed.

By "treat" or other forms of the word, such as "treated" or "treatment," is meant to administer a composition or to perform a method in order to reduce, prevent, inhibit, or eliminate a particular characteristic or event (e.g., Alzheimer's disease). The term "control" is used synonymously with the term "treat."

The term "therapeutically effective" means the amount of the composition used is of sufficient quantity to ameliorate one or more causes or symptoms of a disease or disorder. Such amelioration only requires a reduction or alteration, not necessarily elimination.

The terms "β-amyloid protein", "β-amyloid peptide", "β-amyloid", "Aβ" and "Aβ peptide" are used interchangeably herein and refer to a ~4-kDa internal fragment of 39-43 amino acids, such as such as, $A\beta_{32}$, $A\beta_{40}$, $A\beta_{41}$, $A\beta_{42}$, and $A\beta_{43}$, of the larger transmembrane glycoprotein termed amyloid precursor protein.

When trade names are used herein, applicants intend to independently include the trade name product formulation, the generic drug, and the active pharmaceutical ingredient(s) of the trade name product.

Provided herein is an AIEgen having a Formula 1:

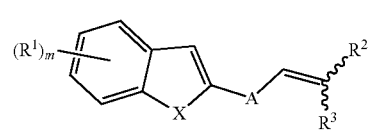

or a pharmaceutically acceptable salt thereof, wherein:
m is a whole number selected from 1-4;
n for each instance is a whole number selected from 1-6;
p is a whole number selected from 1-4;
q is a whole number selected from 2-6;
A is a bond or a moiety having the structure:

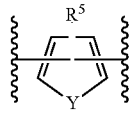

Y is O, S, or —$NR^6$—;
X is —O(C=O)— or —($R^4$)C=C($R^4$)—;
$R^1$ for each instance is independently hydrogen, halide, cyano, nitro, —$OR^7$, —$SR^7$, —$N(R^7)_2$, —(C=O)$R^7$, —(C=O)$OR^7$, —(C=O)$N(R^7)_2$, —$N(R^7)$(C=O)$R^7$, —O(C=O)$R^7$, —$N(R^7)$(C=O)$OR^7$, —O(C=O)N($R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^2$ is a moiety having structure:

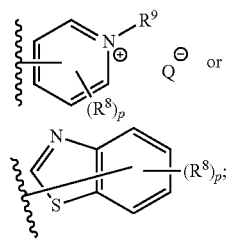

$R^3$ is hydrogen or cyano;
$R^4$ for each instance is independently hydrogen, alkyl, cycloalkyl, alkenyl, alkynyl, aryl, aralkyl, heterocycloalkyl, or heteroaryl;

$R^5$ is hydrogen, halide, cyano, nitro, —$OR^7$, —$SR^7$, —$N(R^7)_2$, —$(C=O)R^7$, —$(C=O)OR^7$, —$(C=O)N(R^7)_2$, —$N(R^7)(C=O)R^7$, —$O(C=O)R^7$, —$N(R^7)(C=O)OR^7$, —$O(C=O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;

$R^6$ is hydrogen, alkyl, cycloalkyl, alkenyl, alkynyl, aryl, aralkyl, heterocycloalkyl, or heteroaryl;

$R^7$ for each occurrence is independently hydrogen, alkyl, cycloalkyl, alkenyl, alkynyl, aryl, aralkyl, heterocycloalkyl, heteroaryl, or —$(CH_2)_nZ$; or two instances of $R^7$ taken together with the atom or atoms to which they are covalently bonded form a 3-7 membered cycloalkyl, or 3-7 membered heterocycloalkyl;

$R^8$ for each instance is independently hydrogen, halide, cyano, nitro, —$OR^7$, —$SR^7$, —$N(R^7)_2$, —$(C=O)R^7$, —$(C=O)OR^7$, —$(C=O)N(R^7)_2$, —$N(R^7)(C=O)R^7$, —$O(C=O)R^7$, —$N(R^7)(C=O)OR^7$, —$O(C=O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;

$R^9$ is alkyl, cycloalkyl, alkenyl, alkynyl, aryl, aralkyl, heterocycloalkyl, heteroaryl, —$(CH_2)_qOH$, or —$(CH_2)_qNH_2$; Q is an anion; and Z for each instance is independently halide, —C≡CH, —$N_3$, —NCS, —NCO, —$OR^7$, —$SR^7$, —$N(R^7)_2$, —$(C=O)R^7$, —$(C=O)OR^7$, —$(C=O)N(R^7)_2$, —$N(R^7)(C=O)R^7$, —$O(C=O)R^7$, —$N(R^7)(C=O)OR^7$, —$O(C=O)N(R^7)_2$, —$SO_2R^7$, —$SO_2N(R^7)_2$, or N-maleimide.

In instances in which X is —O(C=O)—, the AIEgen can have a Formula 3:

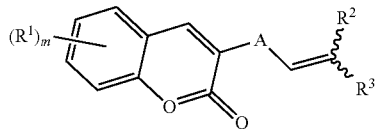

3 or a pharmaceutically acceptable salt thereof, wherein each of $R^1$, $R^2$, $R^3$, A, and m are as defined herein.

In instances in which X is —$(R^4)C=C(R^4)$—, the AIEgen can have a Formula 4:

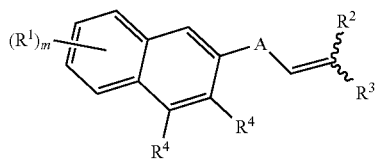

4 or a pharmaceutically acceptable salt thereof, wherein each of $R^1$, $R^2$, $R^3$, $R^4$, A, and m are as defined herein.

In instances in which A is a bond, the AIEgen can have a Formula 5:

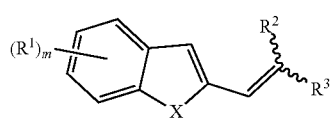

5 or a pharmaceutically acceptable salt thereof, wherein each of $R^1$, $R^2$, $R^3$, X, and m are as defined herein.

In instances in which $R^2$ is a benzothiazole moiety of formula:

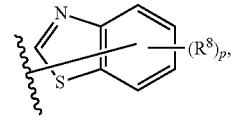

the benzothiazole moiety can be covalently bonded at the C2, C4, C5, C6, or C7 carbon as shown below:

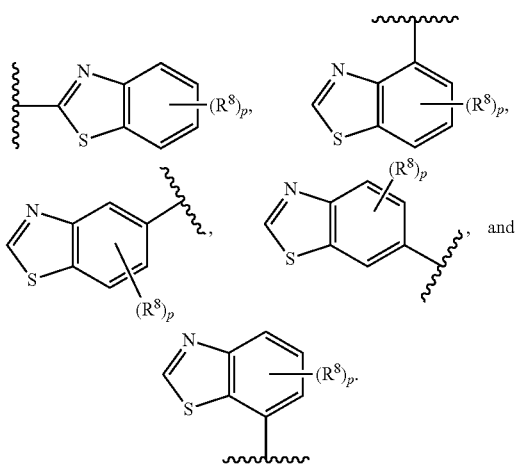

In certain embodiments, each of m and p is independently selected from 1-4, 1-3, 1-2, or 1.

In certain embodiments, q is 2-5, 3-5, 2-4, or 2-3.

In certain embodiments, n is 1-6, 2-6, 2-5, 2-4, or 2-3.

In certain embodiments, A is a bond or a moiety selected from the group consisting of:

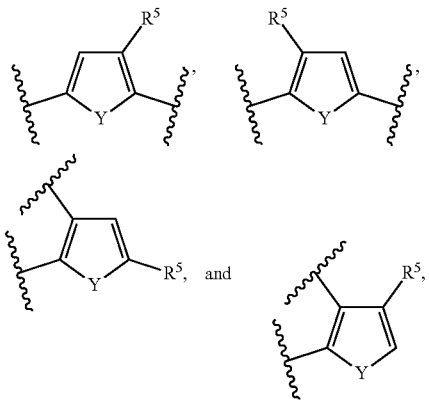

wherein each of Y and $R^5$ are as defined herein.

Y can be S, O, or —$NR^6$—, wherein $R^6$ is hydrogen or alkyl. In certain embodiments, Y is S or O.

$R^1$ for each instance can independently be selected from the group consisting of hydrogen, halide, —$OR^7$, —$SR^7$, —$N(R^7)_2$, —$N(R^7)(C=O)R^7$, —$O(C=O)R^7$, —$N(R^7)(C=O)OR^7$, —$O(C=O)N(R^7)_2$, —alkyl, cycloalkyl, alkenyl, alkynyl, aryl, aralkyl, heterocycloalkyl, heteroaryl, and —(CH$_2$)$_n$Z; In certain embodiments, one instance of R$^1$ is —N(R$^7$)$_2$. In certain embodiments, one instance of R$^1$ is —N(R$^7$)$_2$, wherein each instance of R$^7$ is independently hydrogen, alkyl, cycloalkyl, alkenyl, alkynyl, aryl, aralkyl, heterocycloalkyl, heteroaryl, or —(CH$_2$)$_n$Z.

In certain embodiments, R$^2$ is a moiety selected from the group consisting of:

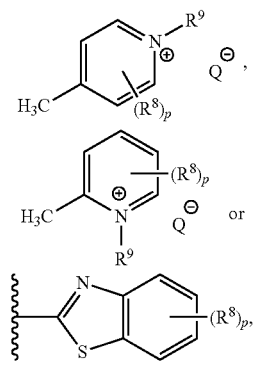

wherein each of p, Q, R$^8$, and R$^9$ are as defined herein.

R$^3$ for each instance can independently be hydrogen or alkyl.

R$^4$ can be hydrogen, —OR$^7$, —SR$^7$, —N(R$^7$)$_2$, —N(R$^7$)(C═O)R$^7$, —O(C═O)R$^7$, —N(R$^7$)(C═O)OR$^7$, —O(C═O)N(R$^7$)$_2$, alkyl, cycloalkyl, alkenyl, alkynyl, aryl, aralkyl, heterocycloalkyl, heteroaryl, or —(CH$_2$)$_n$Z. In certain embodiments, R$^5$ is hydrogen.

In certain embodiments, R$^6$ is hydrogen or alkyl.

R$^7$ for each occurrence can independently be hydrogen, alkyl, cycloalkyl, alkenyl, alkynyl, aryl, aralkyl, heterocycloalkyl, heteroaryl, or —(CH$_2$)$_n$Z; or two instances of R$^7$ taken together with the atom or atoms to which they are covalently bonded form a 3-7 membered cycloalkyl, or 3-7 membered heterocycloalkyl. In certain embodiments, R$^7$ for each occurrence is independently alkyl, cycloalkyl, aryl, aralkyl, heterocycloalkyl, heteroaryl, or —(CH$_2$)$_n$Z; or two instances of R$^7$ taken together with the atom or atoms to which they are covalently bonded form a 3-7 membered cycloalkyl, or 3-7 membered heterocycloalkyl.

R$^8$ for each instance can independently be selected from the group consisting of hydrogen, halide, —OR$^7$, —SR$^7$, —N(R$^7$)$_2$, —N(R$^7$)(C═O)R$^7$, —O(C═O)R$^7$, —N(R$^7$)(C═O)OR$^7$, —O(C═O)N(R$^7$)$_2$, —alkyl, cycloalkyl, alkenyl, alkynyl, aryl, aralkyl, heterocycloalkyl, heteroaryl, and —(CH$_2$)$_n$Z. In certain embodiments, R$^8$ is hydrogen.

In certain embodiments, R$^9$ is alkyl, —(CH$_2$)$_q$OH, or —(CH$_2$)$_q$NH$_2$. In certain embodiments, R$^9$ is —(CH$_2$)$_q$OH or —(CH$_2$)$_q$NH$_2$, wherein q is 2-5, 2-4, 2-3, or 2.

In certain embodiments, Z for each instance is independently halide, —C≡CH, —N$_3$, —NCS, —NCO, —OH, —SH, —NH$_2$, —(C═O)H, —(C═O)OH, or N-maleimide.

Q can be any anion known in the art. In certain embodiments, Q for each instance is independently a pharmaceutically acceptable anion. Exemplary pharmaceutically acceptable anions, include, but are not limited to, acetate, benzenesulfonate, benzoate, bicarbonate, bisulfate, bitartrate, borate, bromide, calcium edetate, camsylate, carbonate, chloride, clavulanate, citrate, dihydrochloride, edetate, edislyate, estolate, esylate, ethylsuccinate, fumarate, gluceptate, gluconate, glutamate, glycollylarsanilate, hexylresorcinate, hydrabamine, bromide, chloride, iodide, isothionate, lactate, lactobionate, laurate, malate, maleate, mandelate, mesylate, methylsulfate, mucate, napsylate, nitrate, oleate, oxalate, pamoate (embonate), palmitate, pantothenate, phosphate/diphosphate, polygalacturonate, salicylate, stearate, subacetate, succinate, tannate, tartrate, teoclate, tosylate, triethiodode, and valerate salts. In certain embodiments, Q for each instance is bromide.

In certain embodiments, the AIEgen is selected from the group consisting of:

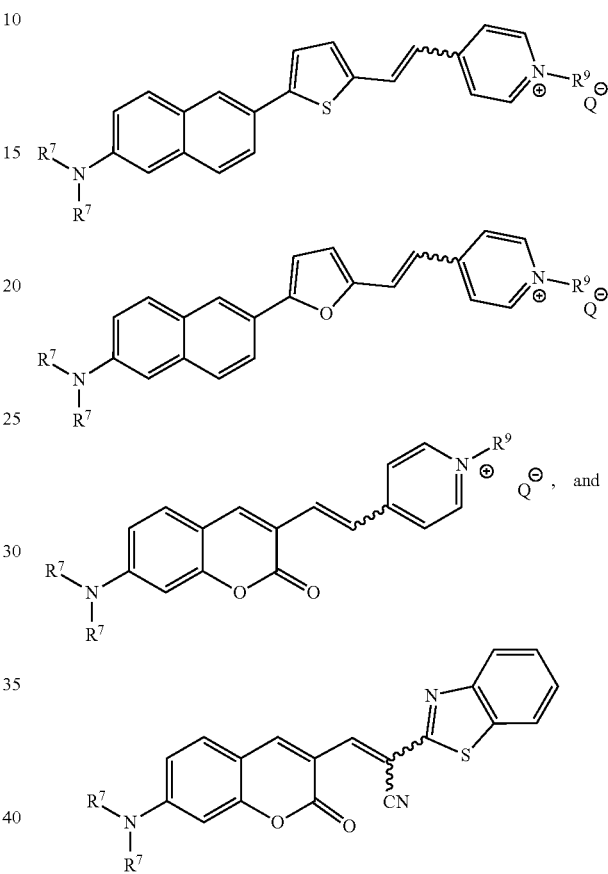

or a pharmaceutically acceptable salt thereof, wherein
n is a whole number selected from 2-4;
q is a whole number selected from 2-4;
R$^7$ for each instance is hydrogen, alkyl, cycloalkyl, alkenyl, alkynyl, aryl, aralkyl, heterocycloalkyl, heteroaryl, or —(CH$_2$)$_n$Z; or two instances of R$^7$ taken together with nitrogen to which they are covalently bonded form a 3-6 membered heterocycloalkyl;
R$^9$ is alkyl, —(CH$_2$)$_q$OH, or —(CH$_2$)$_q$NH$_2$;
Z is halide, —C≡CH, —N$_3$, —NCS, —NCO, —OH, —SH, —NH$_2$, —(C═O)H, —(C═O)OH, or N-maleimide; and Q is a pharmaceutically acceptable anion.

In certain embodiments, the AIEgen is selected from the group consisting of:

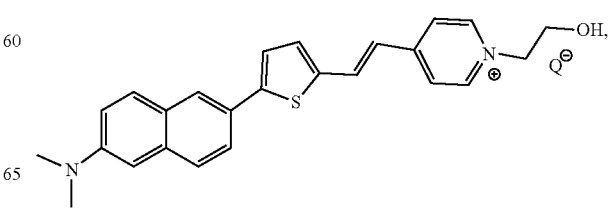

-continued

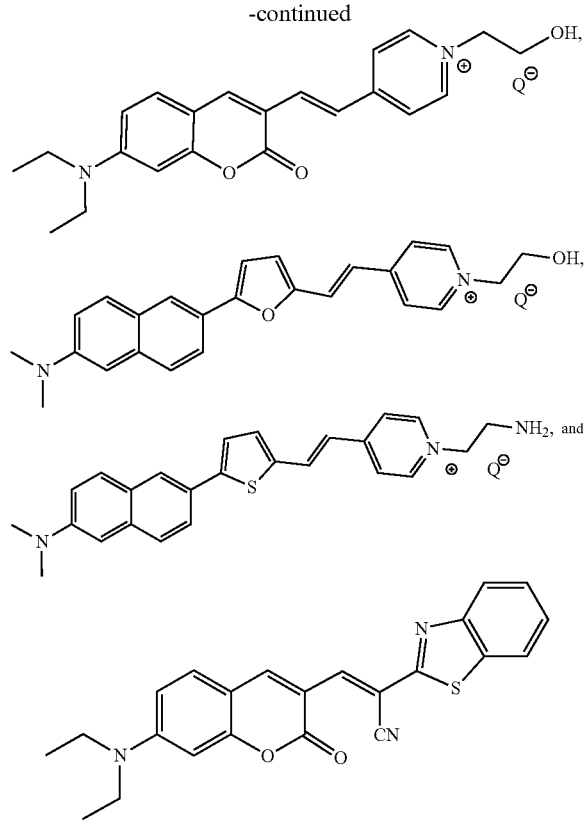

or a pharmaceutically acceptable salt thereof, wherein Q is a pharmaceutically acceptable anion.

The present disclosure also provides a pharmaceutical composition comprising an AIEgen described herein and at least one pharmaceutically acceptable excipient or carrier.

The AIEgen described herein and their pharmaceutically acceptable salts can be administered to a subject either alone or in combination with pharmaceutically acceptable, excipients, carriers, and/or diluents in a pharmaceutical composition according to standard pharmaceutical practice. The AIEgen can be administered orally or parenterally. Parenteral administration includes intravenous, intramuscular, intraperitoneal, subcutaneous and topical, the preferred method being intravenous administrations.

Accordingly, the present disclosure provides pharmaceutically acceptable compositions, which comprise a therapeutically effective amount of an AIEgen described herein, formulated together with one or more pharmaceutically, excipients, acceptable carriers (additives) and/or diluents. The pharmaceutical compositions of the present disclosure may be specially formulated for administration in solid or liquid form, including those adapted for the following: (1) parenteral administration, for example, by subcutaneous, intramuscular, intravenous or epidural injection as, for example, a sterile solution or suspension, or sustained-release formulation; and (2) oral administration, for example, drenches (aqueous or non-aqueous solutions or suspensions), tablets, e.g., those targeted for buccal, sublingual, and systemic absorption, boluses, powders, granules, pastes for application to the tongue.

As set out herein, certain embodiments of the AIEgen described herein may contain a basic functional group, such as amino, and are, thus, capable of forming pharmaceutically acceptable salts with pharmaceutically acceptable acids. The term "pharmaceutically acceptable salts" in this respect, refers to the relatively non-toxic, inorganic and organic acid addition salts of AIEgen of the present disclosure. These salts can be prepared in situ in the administration vehicle or the dosage form manufacturing process, or by separately reacting a purified AIEgen described herein in its free base form with a suitable organic or inorganic acid, and isolating the salt thus formed during subsequent purification. Representative salts include the hydrobromide, hydrochloride, sulfate, bisulfate, nitrate, acetate, valerate, oleate, palmitate, stearate, laurate, benzoate, lactate, phosphate, tosylate, citrate, maleate, fumarate, succinate, tartrate, napthylate, mesylate, glucoheptonate, lactobionate, and laurylsulphonate salts and the like.

The pharmaceutically acceptable salts of the AIEgen of the present disclosure include the conventional non-toxic salts or quaternary ammonium salts of the AIEgen, e.g., from non-toxic organic or inorganic acids. For example, such conventional non-toxic salts include those derived from inorganic acids such as hydrochloride, hydrobromic, sulfuric, sulfamic, phosphoric, nitric, and the like; and the salts prepared from organic acids such as acetic, propionic, succinic, glycolic, stearic, lactic, malic, tartaric, citric, ascorbic, palmitic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isothionic, and the like.

In other cases, the AIEgen described herein may contain one or more acidic functional groups and, thus, are capable of forming pharmaceutically acceptable salts with pharmaceutically acceptable bases. The term "pharmaceutically acceptable salts" in these instances refers to the relatively non-toxic, inorganic and organic base addition salts of AIEgen of the present disclosure. These salts can likewise be prepared in situ in the administration vehicle or the dosage form manufacturing process, or by separately reacting the purified AIEgen in its free acid form with a suitable base, such as the hydroxide, carbonate or bicarbonate of a pharmaceutically-acceptable metal cation, with ammonia, or with a pharmaceutically-acceptable organic primary, secondary or tertiary amine. Representative alkali or alkaline earth salts include the lithium, sodium, potassium, calcium, magnesium, and aluminum salts and the like. Representative organic amines useful for the formation of base addition salts include ethylamine, diethylamine, ethylenediamine, ethanolamine, diethanolamine, piperazine and the like.

Wetting agents, emulsifiers and lubricants, such as sodium lauryl sulfate and magnesium stearate, as well as coloring agents, release agents, coating agents, sweetening, flavoring and perfuming agents, preservatives, solubilizing agents, buffers and antioxidants can also be present in the compositions.

Methods of preparing these formulations include the step of bringing into association an AIEgen described herein with the carrier or excipient and, optionally, one or more accessory ingredients. In general, the formulations are prepared by uniformly and intimately bringing into association an AIEgen of the present disclosure with liquid carriers (liquid formulation), liquid carriers followed by lyophylization (powder formulation for reconstitution with sterile water or the like), or finely divided solid carriers, or both, and then, if necessary, shaping or packaging the product.

Pharmaceutical compositions of the present disclosure suitable for parenteral administration can comprise an AIEgen described herein in combination with one or more pharmaceutically-acceptable sterile isotonic aqueous or non-aqueous solutions, dispersions, suspensions or emulsions, or sterile powders which may be reconstituted into sterile injectable solutions or dispersions just prior to use, which may contain sugars, alcohols, antioxidants, buffers, bacteriostats, chelating agents, solutes which render the formulation isotonic with the blood of the intended recipient or suspending or thickening agents.

Examples of suitable aqueous and non-aqueous carriers which may be employed in the pharmaceutical compositions of the disclosure include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants, such as preservatives, wetting agents, emulsifying agents and dispersing agents. Prevention of the action of microorganisms upon the AIEgen of the present disclosure may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption, such as aluminum monostearate and gelatin.

The AIEgen described herein can be readily prepared using well known methods in the art. In certain embodiments, the AIEgen described herein is prepared according to a method comprising: contacting a compound having Formula 6:

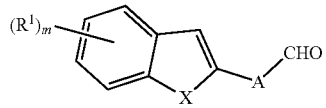

6 m is a whole number selected from 1-4;
n for each instance is a whole number selected from 1-6;
A is a bond or a moiety having the structure:

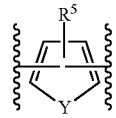

Y is O, S, or —$NR^6$—;
X is —O(C=O)— or —$(R^4)C$=$C(R^4)$—;
$R^1$ for each instance is independently hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^4$ for each instance is independently hydrogen, alkyl, cycloalkyl, alkenyl, alkynyl, aryl, aralkyl, heterocycloalkyl, or heteroaryl;
$R^5$ is hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)$ $(C$=$O)OR^7$, —$O(C$=$O)N(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^6$ is hydrogen, alkyl, cycloalkyl, alkenyl, alkynyl, aryl, aralkyl, heterocycloalkyl, or heteroaryl;
$R^7$ for each occurrence is independently hydrogen, alkyl, cycloalkyl, alkenyl, alkynyl, aryl, aralkyl, heterocycloalkyl, heteroaryl, or —$(CH_2)_nZ$; or two instances of $R^7$ taken together with the atom or atoms to which they are covalently bonded form a 3-7 membered cycloalkyl, or 3-7 membered heterocycloalkyl; and
Z for each instance is independently halide, —C≡CH, —$N_3$, —NCS, —NCO, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N(R^7)_2$, —$SO_2R^7$, —$SO_2N(R^7)_2$, or N-maleimide;
with a secondary amine and a compound of Formula 7a, 7b, or 7c:

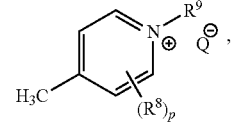

7a

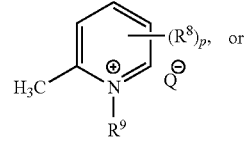

7b

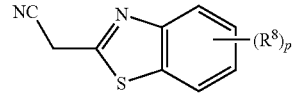

7c or a conjugate base thereof, wherein
p is a whole number selected from 1-4;
$R^8$ for each instance is independently hydrogen, halide, cyano, nitro, —$OR^7$, —$SR^7$, —$N(R^7)_2$, —$(C$=$O)R^7$, —$(C$=$O)OR^7$, —$(C$=$O)N(R^7)_2$, —$N(R^7)(C$=$O)R^7$, —$O(C$=$O)R^7$, —$N(R^7)(C$=$O)OR^7$, —$O(C$=$O)N$ $(R^7)_2$, —$SO_2R^7$, —$SO_2N(R^7)_2$, alkyl, cycloalkyl, alkenyl, alkynyl, aryl, aralkyl, heterocycloalkyl, heteroaryl, or —$(CH_2)_nZ$;
$R^9$ is alkyl, cycloalkyl, alkenyl, alkynyl, aryl, aralkyl, heterocycloalkyl, heteroaryl, —$(CH_2)_qOH$, or —$(CH_2)_qNH_2$; Q is an anion;
thereby forming the AIEgen having Formula 1.

Any secondary amine can be used in the method for preparing the AIEgen having Formula 1. The selection of a suitable secondary amine is well within the skin of a person of ordinary skill in the art. In certain embodiments, the dialkylamine has the formula $HN(R^{13})_2$, wherein $R^{13}$ for each occurrence is independently alkyl, cycloalkyl, or heterocycloalkyl; or two instances of $R^{13}$ taken together form 5-6 membered heterocycloalyl comprising heteroatoms selected from O, N, and S. Exemplary secondary amines include, but are not limited to dialkyl amines, such as dimethylamine, diethyl amine, morpholine, piperazine piperidine, pyrrolidine, and the like.

The compound of Formula 6, the secondary amine, and the compound of Formula 7a or 7b can be contacted in any order. In certain embodiments, all or some of reagents are added substantially at the same time, added sequentially, or a combination thereof. In certain embodiments, the secondary amine is brought into contact with the compound of Formula 6 and then the compound of Formula 7a or 7b is brought in to contact. In other embodiments, the compound of Formula 6 is brought in to contact with the compound of Formula 7a or 7b and then the secondary amine is brought in to contact.

The preparation of the AIEgen having Formula 1 can be conducted in any solvent, conducted neat, or conducted using the secondary amine as the solvent. Exemplary solvents include polar solvents, such as water, polar protic organic solvents, polar aprotic organic solvents, and mixtures thereof. Exemplary solvents include, but are not limited to, alcohols, ketones, formamides, haloalkanes, aromatic solvents, ethers, dialkylsulfoxides, and mixtures thereof. In certain embodiments, the solvent is methanol, ethanol, 1-propanol, 2-propanol, or a mixture thereof.

The preparation of the AIEgen having Formula 1 can be conducted at a temperature between 23-120° C. In certain embodiments, the preparation of the AIEgen having Formula 1 can is conducted at a temperature 23-100° C., 23-90° C., 30-90° C., 40-90° C., 50-120° C., 60-90° C., 70-90° C., or 70-80° C.

The present disclosure also provides a method of imaging a β-amyloid peptide, the method comprising contacting the β-amyloid peptide with an AIEgen described herein; irradiating the AIEgen with electromagnetic radiation; and detecting luminescence from the AIEgen. The method can be conducted in vivo, in vitro, or ex vivo.

β-amyloid peptide can be $A\beta_{39}$, $A\beta_{40}$, $A\beta_{41}$, $A\beta_{42}$, and $A\beta_{43}$, or a mixture thereof. In certain embodiments, the β-amyloid peptide is $A\beta_{42}$.

The electromagnetic radiation may have an absorption wavelength $\lambda_{abs}$ between 400-600 nm, 450-550 nm, 450-525 nm, 450-500 nm, 470-500 nm, or 480-500 nm.

The luminescence may have an emission wavelength $\lambda_{em}$ between 600-750 nm, 600-725 nm, 600-710 nm, 600-705 nm, 600-700 nm, 600-690 nm, 650-700 nm, 690-705 nm, or 660-690 nm.

In certain embodiments, the AIEgen exhibits a signal-to-noise ratio (S/N) of 5-15-fold, 6-15-fold, 7-15-fold, 8-15-fold, 9-15-fold, 10-15-fold, 11-15-fold, 12-15-fold, 13-15-fold, or 14-15-fold.

The present disclosure also provides method of at least partially inhibiting Aβ fibrillogenesis the method comprising contacting Aβ peptides with an AIEgen described herein thereby at least partially inhibiting Aβ fibrillogenesis. In certain embodiments, the step of at least partially inhibiting Aβ fibrillogenesis comprises inhibiting the formation of β-sheet structure Aβ peptides.

Also provided herein is a method of treating Alzheimer's in a subject in need thereof, the method comprising: administering a therapeutically effective amount of an AIEgen described herein to the subject. In certain embodiments, the subject is a human.

Figure 1:
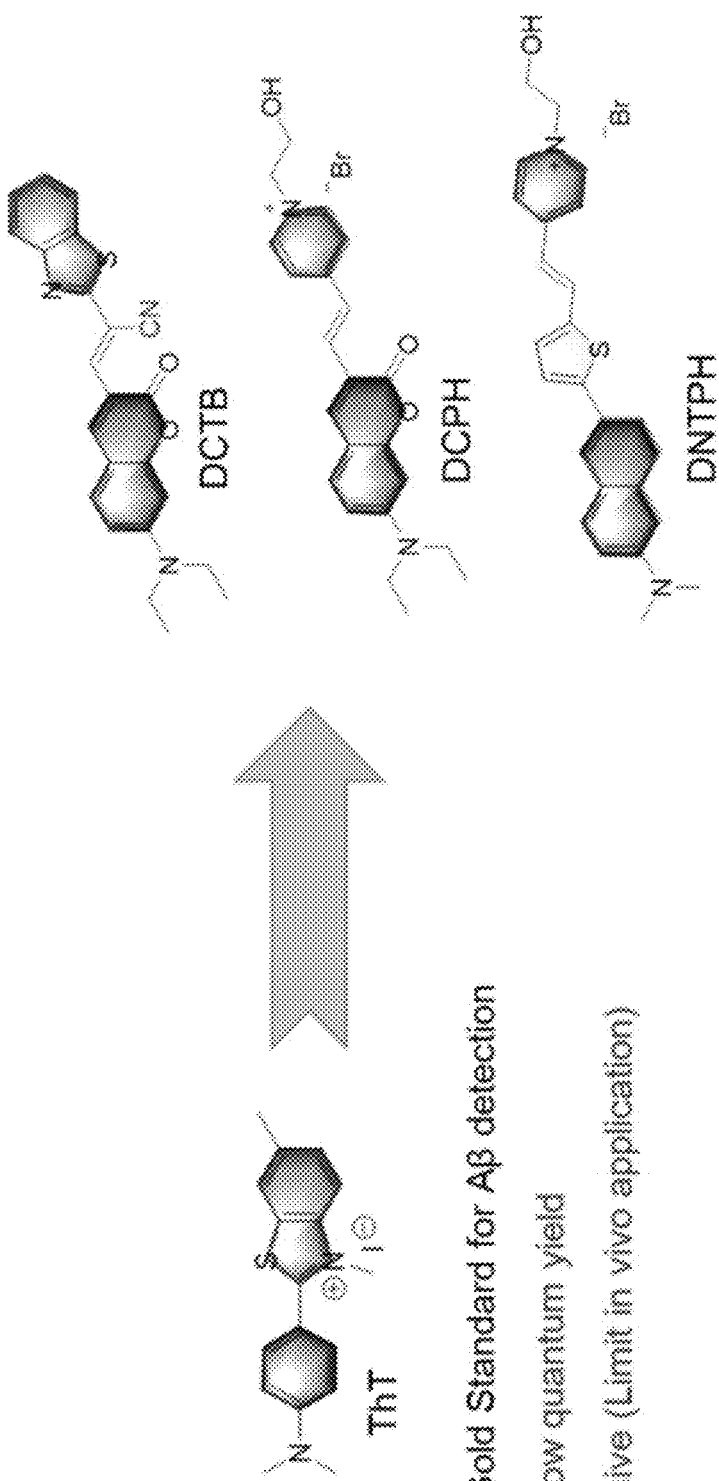
FIG. 1 depicts the chemical structure of ThT and exemplary NIR AIEgens DCTB, DCPH, and DNTPH.
Figure 2:
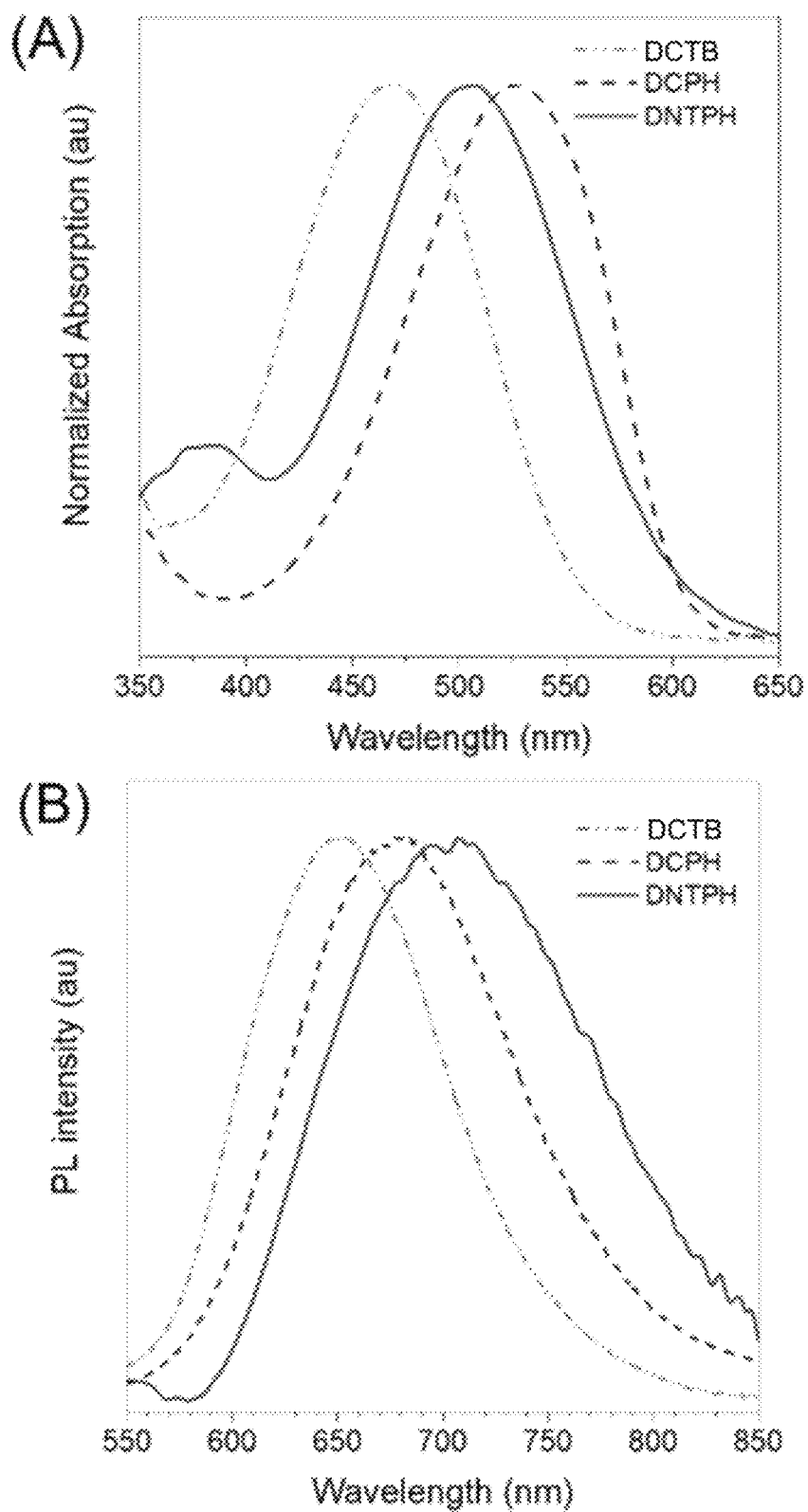
FIG. 2 depicts (A) Normalized absorption spectra of DCTB, DCPH and DNTPH in DMSO solution; (B) Normalized fluorescence (PL) spectra of DCTB, DCPH and DNTPH in aggregates; (C) Plot of the changes in fluorescence intensity with different water fraction ($f_w$, in volume percentage, vol %), where I0 and I are the maximal fluorescence intensity recorded before and after adding water into the THF solution of DCTB. (D) Plot of the changes in fluorescence intensity with different toluene fractions ($f_t$, in volume percentage, vol %), where $I_0$ and I are the maximal fluorescence intensity recorded before and after adding toluene into the DMSO solution of DCPH and DNTPH respectively. [AIE dyes]=10 μM.
Figure 2:
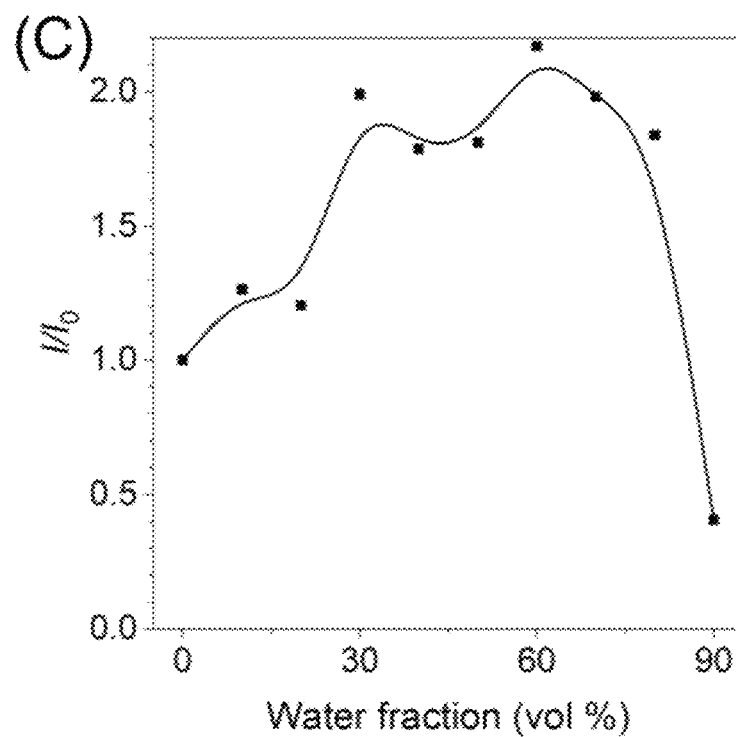
Figure 2:
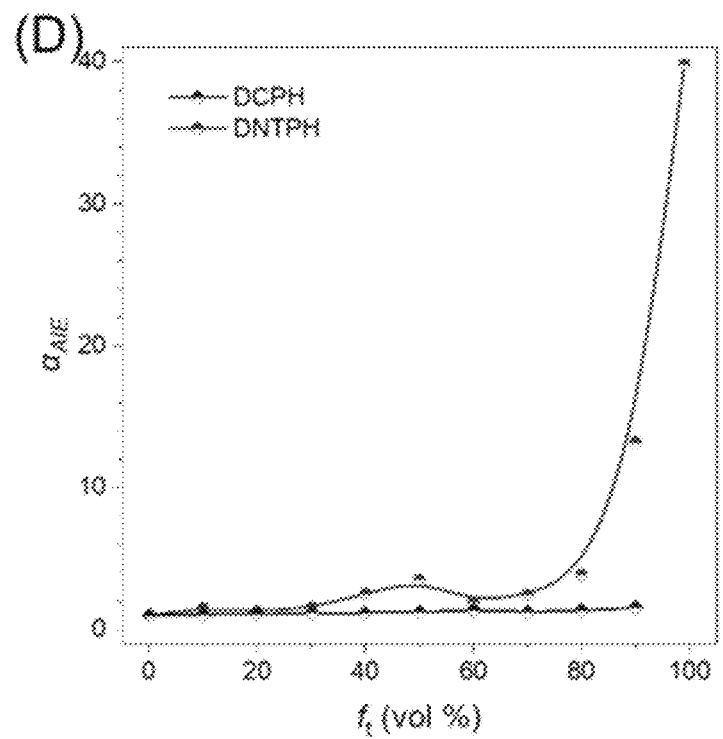

DCTB and DCPH were synthesized and their structure-activity relationship was investigated (FIG. 1). Due to the strong ICT properties, they exhibited emission maximum at 601 and 690 nm, respectively (FIG. 2). For hydrophobic DCTB, it was soluble in THF but aggregated in water, a poor solvent. It showed very weak AIE effect by only increasing less than 2-fold when the water fractions (fw) reach to 70% (FIG. 2C).

For DCPH, it is more soluble in water and polar solvent due to the introduction of pyridinium salts with hydroxyl groups. The AIE property was studied in DMSO/toluene mixtures with different toluene fractions ($f_t$) and the PL intensity was found to enhance about 2-fold in aggregates (99% of $f_t$) compared with that in DMSO solution (FIG. 2D). However, to achieve a more obvious emission enhancement with low background signals, the TICT and AIE properties can be further modified. In contrast, upon a change of stronger electron-donating moieties with extensive aromatic thiophene bridge, amphiphilic AIEgens exemplified by DNTPH were developed with the outstanding AIE phenomena and good water solubility. DNTPH was non-emissive in aqueous solution, and its NIR fluorescence at 683 nm was continuously intensified until the volume fraction of toluene ($f_t$) and the fluorescence enhancement was increased to about 40-fold (FIG. 2D). In addition, initial weedy fluorescence intensity of DNTPH in aqueous solution and the outstanding emission enhancement behavior in the aggregated state made it an ideal candidate for detecting protein fibrillogenesis, like Aβ aggregates.

EXAMPLES

Example 1—Synthesis of DCTB

A mixture of 7-(diethylamino)-2-oxo-2H-chromene-3-carbaldehyde (245 mg, 1.0 mmol), benzothiazole-2-acetonitrile (195 mg, 1.1 mmol) and a few drops of piperidine in ethanol (EtOH, 5 mL) was heated to reflux for 5 h. After cooling down to room temperature, the solvent was removed under vacuum. The crude product was purified by silica gel chromatography using n-hexane/DCM=3:1, v/v as eluent to give the red product (320 mg, 78% yield). $^1$H NMR (Chloroform-d, 400 MHz): δ=8.91 (s, 1H), 8.40 (s, 1H), 8.09 (d, J=8.2 Hz, 1H), 7.88 (d, J=8.0 Hz, 1H), 7.50 (t, J=7.7 Hz, 1H), 7.46-7.39 (m, 2H), 6.66 (d, J=9.0 Hz, 1H), 6.50 (s, 1H), 3.48 (q, 4H), 1.27 (t, J=7.1 Hz, 6H) ppm.

Example 2—Synthesis of DCPH

A mixture of 7-(diethylamino)-2-oxo-2H-chromene-3-carbaldehyde (245 mg, 1.0 mmol), 1-(2-hydroxyethyl)-4-methylpyridinium bromide (310 mg, 1.1 mmol) and a few drops of piperidine in EtOH (5 mL) was heated to reflux for 8 h. After cooling down to room temperature, the solvent was removed under vacuum. The crude product was purified by silica gel chromatography using DCM/MeOH=10:1, v/v as eluent to give the red product (250 mg, 56% yield). $^1$H NMR (DMSO-d6, 400 MHz): δ=8.77 (d, J=6.6 Hz, 2H), 8.24 (s, 1H), 8.17 (d, J=6.4 Hz, 2H), 7.83 (d, J=16.08 Hz, 1H), 7.68 (d, J=16.04, 1H), 7.54 (d, J=9.0 Hz, 1H), 6.80 (d, J=8.04 Hz, 1H), 6.60 (s, 1H), 5.27 (t, J=5.24 Hz, 1H), 4.52 (t, J=4.84, 2H), 3.86-3.82 (m, 2H), 3.52-3.40 (m, 4H), 1.15 (t, J=6.24 Hz, 6H) ppm.

Example 3—Synthesis of DNTPH

A mixture of 5-(6-(dimethylamino)naphthalen-2-yl)thiophene-2-carbaldehyde (140 mg, 0.5 mmol), benzothiazole-2-acetonitrile (160 mg, 0.6 mmol) and a few drops of piperidine in EtOH (5 mL) was heated to reflux for overnight. After cooling down to room temperature, the solvent was removed under vacuum. The crude product was purified by silica gel chromatography using DCM/MeOH=10:1, v/v as eluent to give the dark red product (150 mg, 64% yield). $^1$H NMR (DMSO-d6, 400 MHz): δ=8.82 (d, J=6.4 Hz, 2H), 8.25 (d, J=15.9, 1H), 8.20 (d, J=6.4 Hz, 2H), 8.08 (s, 1H), 7.82 (d, J=9.1 Hz, 1H), 7.73 (s, 2H), 7.66 (d, J=3.72 Hz, 1H), 7.56 (d, J=3.92 Hz, 1H), 7.28-7.25 (m, 1H), 7.16 (d, J=15.91 Hz, 1H), 6.96 (s, 1H), 4.54 (t, J=4.9 Hz, 2H), 3.88-3.84 (q, 2H), 3.05 (s, 6H) ppm.

Example 4—Aβ Fibrils Detection Ability

Figure 3:
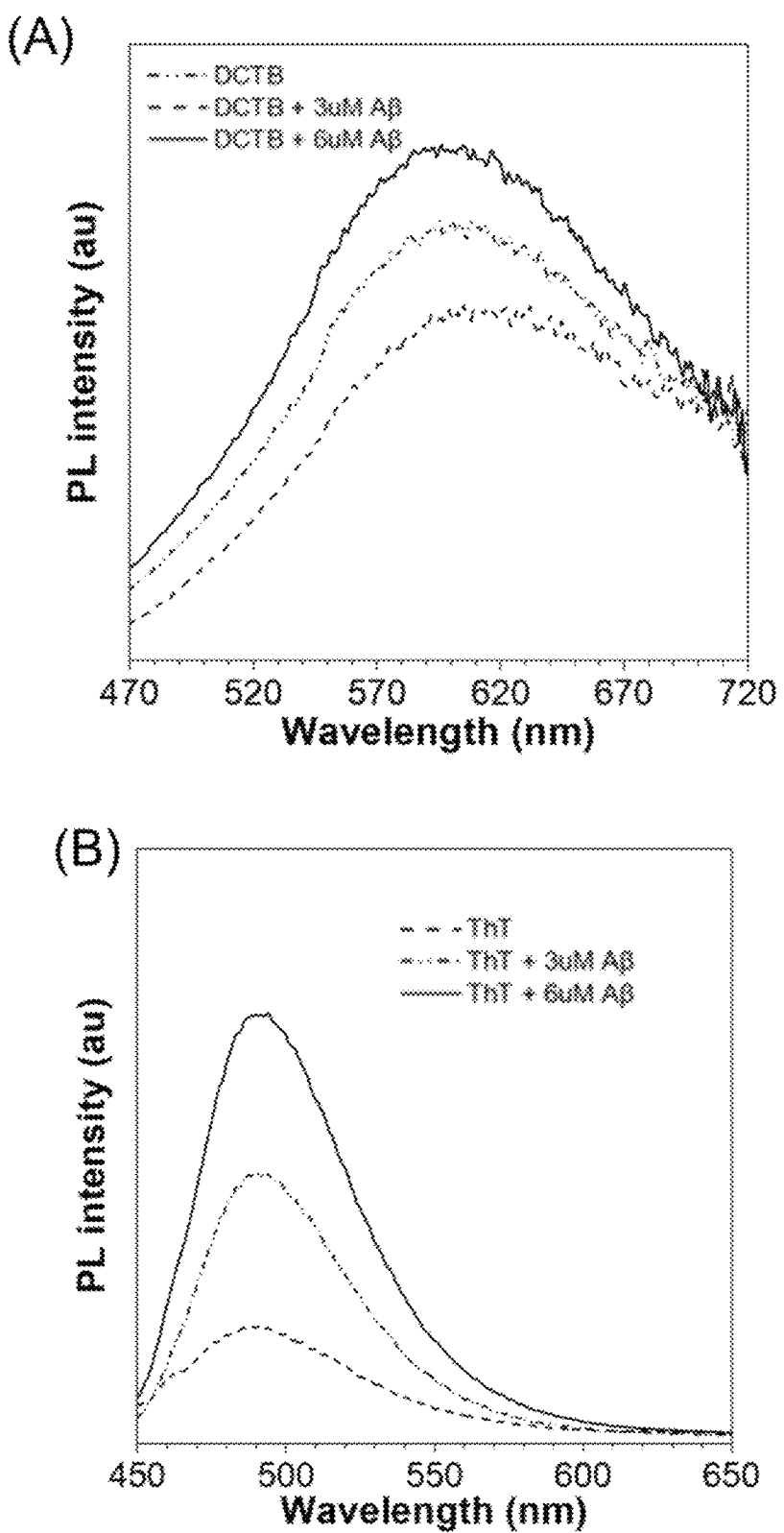
FIG. 3 depicts PL spectra of AIE fluorescence dyes (A) DCTB, (B) commercial dye ThT, (C) DCPH, and (D) DNTPH in the PBS buffer containing different amounts of Aβ₄₂ fibrils. [AIE dyes]: 1 μM
Figure 3:
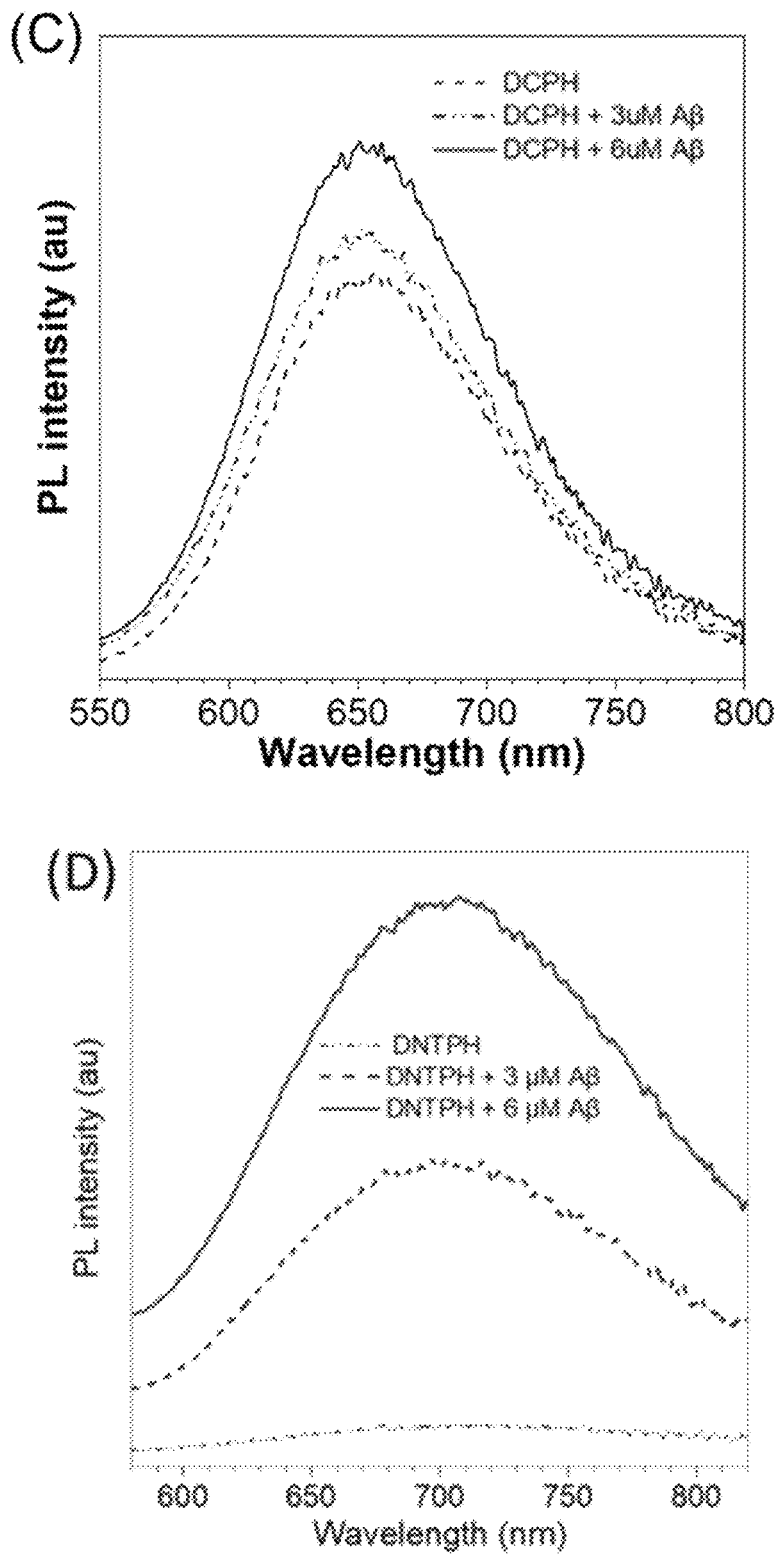
Figure 4:
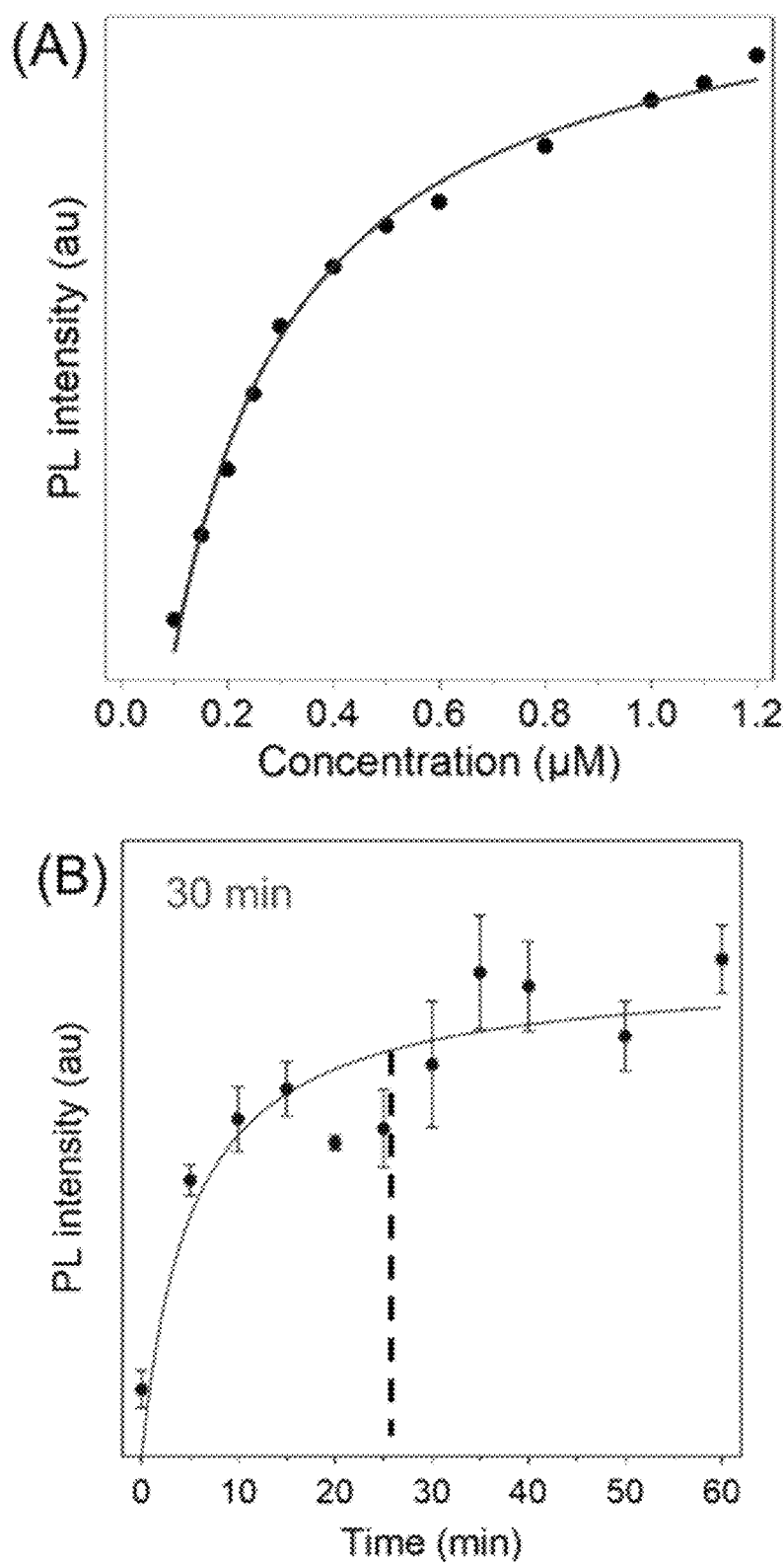
FIG. 4 depicts determination of the binding constant of DNTPH for Aβ₄₂ aggregates. (A) Plot of the PL intensity as a function of the concentration of DNTPH in the presence of Aβ₄₂ aggregates (3 μM) in PBS solution (pH=7.4); (B)Response time of DNTPH binding to Aβ₄₂ aggregates. (C) High selectivity toward potential competitive species and Aβ₄₂ aggregates. a: Arg, b: Gln, c: Gly, d: Amylin, e: Lysozyme, f: HAS, g: Insulin, h: BSA, i: α-Synuclein. (D)
Figure 4:
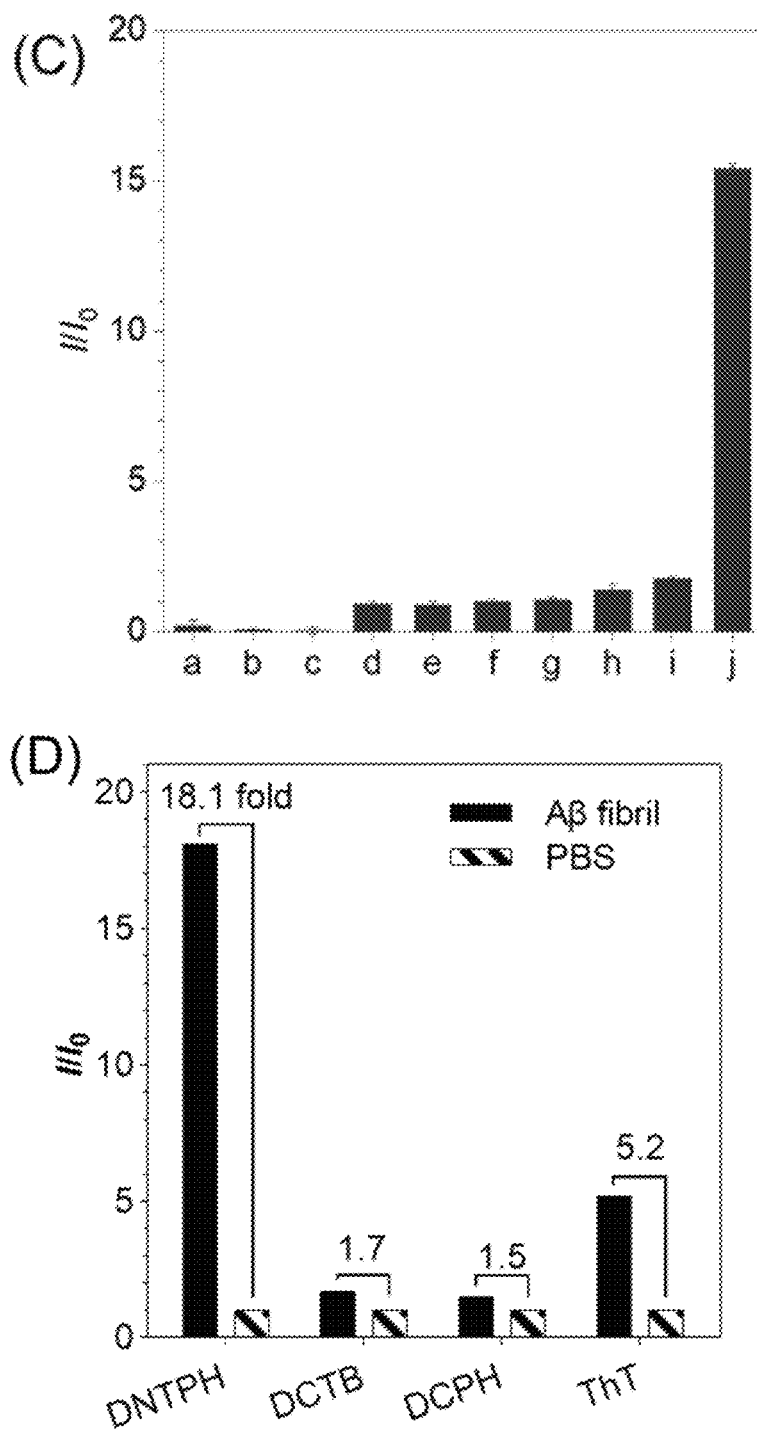

It was investigated whether DNTPH has a fluorescent response upon binding to Aβ aggregates. When DNTPH was titrated with the A$\beta_{42}$ fibril in phosphate buffer, a strong and progressive increase (up to about 18-fold) in red fluorescence intensity concomitant was observed, which took ~30 min to reach a plateau. Without wishing to be bound by theory, it is believed that DNTPH is capable of binding hydrophobic surfaces in aggregated amyloid fibrils with the help of the binding unit, resulting in the decrease of conformational freedom and rotational restriction. In comparison, DCTB and DCPH showed a much lower fluorescent response to the A$\beta_{42}$ fibril (less than 2-fold) (FIG. 3). Although ThT showed stronger fluorescent intensity upon binding to the Aβ aggregates, it showed similar fluorescent response with only 5-fold. That is because these three probes show high background signals, which results in low S/N ratio even with a decent fluorescent response to testing objects. In contrast, DNTPH possesses minimized background (only 1/10 times to that of ThT) in aqueous solution thanks to the water solubility and the AIE effect, which provide a prerequisite for an ultrahigh S/N ratio for Aβ detection (FIG. 4).

Example 5—Aβ Fibrils Inhibition and Mechanistic Studies

Surprisingly, when the morphology of Aβ with or without the dyes by transmission electron microscopy (TEM) microscope was investigated, inhibition of Aβ fibrillation occurs. After incubation with 20 μM of Aβ peptide at 37° C. for 1 day and 2 days, many short and branched Aβ protofibrils and more entangled fibril were observed. However, when 10 μM of DNTPH was added into peptide solution prior to incubating for 2 days, the nucleation phase and elongation are decelerated to a large degree. The Aβ protofibrils dissembled into spherical and amorphous aggregates after further incubation (FIG. 5).

Far-UV CD spectroscopy was used to monitor the changes in the secondary structure of Aβ fibril in the presence and absence of DNTPH (FIG. 5E). As shown, Aβ fibril show an obvious negative CD band at 218 nm which is characteristic of β-sheet structure while the intensity of Aβ peptide is much weaker. In contrast, the incubation of A$\beta_{42}$ in the presence of DNTPH for 2 days led to a much lower CD intensity at 218 nm, which suggests that DNTPH could efficiently inhibit the formation of β-sheet structure. The TEM images and CD spectra are consistent with the ThT assay results, which clearly verified that DNTPH could efficiently inhibit Aβ fibrillation and promote disassembly of Aβ fibrils.

Previous studies revealed that initial stage of the full course of amyloidosis is represented by the excessive accumulation of Aβ monomers caused by imbalanced Aβ clearance. Therefore, most peptide-based inhibitors, antibodies, and small molecules are well designed to target on Aβ monomers and disturbed structural and assembly dynamics. Without wishing to be bound by theory, it is speculated that DNTPH may bind to the amino acid residues at specific sites of pre-aggregate Aβ peptide, delaying the decelerated fibril formation. To gain mechanistic insight into the binding process of DNTPH to Aβ peptide, docking calculations were performed. To search out possible binding modes, a large-scale flexible docking between DNTPH and an ensemble of the protein structures 1,000 flexible docking conformations were generated and the most reliable 100 conformation were chosen. The lowest docking scores are plotted in FIG. 6 against the solvent-accessible surface areas of DNTPH. When we further selected the hydrophobic surface areas of DNTPH and docking with Aβ peptide, a more concise distribution of docking scores was obtained. The two poses with the lowest energies are all realized under the fibril-forming conditions. Top binding poses with the lowest energies of −8.04 and −7.77 kcal/mol are displaying a common structural feature: the phenyl rings of DNTPH are in contact with the hydrophobic residues of Aβ peptides, such as leucine, valine, phenylalanine, and tyrosine. Under the fibril forming process, the chains of Aβ peptide are randomly folded, with large structural flexibility. This enhances the probability of exposure of its hydrophobic residues to solvent, which in turn encourages the binding of DNTPH through hydrophobic interaction (FIGS. 6C and 6D). Moreover, the hydroxyl group of DNTPH can interact with hydrophilic residues, such as arginine and asparagine, via hydrogen bonding, which provides a strong driving force. Therefore, the binding of DNTPH to this segment may thus disturb the structure rearrangement of monomer and hamper the assembly of Aβ fibril, offering a unique mechanistic approach to inhibiting protein amyloidogenesis.

Example 6—In Vitro Imaging Aβ Fibrils and Cells Recovered by DNTPH from Aβ Fibrils-Induced Cytotoxicity The significant inhibitory effect of DNTPH on amyloid fibril formation encouraged examination of the ability of DNTPH for preventing A$\beta_{42}$ fibrils-induced cellular toxicity using MTT [3-(4,5-dimethylthiazol-2-yl)-2,5-diphenyltetrazoliumbromide] assay. As displayed in FIG. 7, DNTPH had little effect on neuroendocrine PC12 cell viability even at a high concentration of 100 μM. On the contrary, the aged A$\beta_{42}$ fibrils alone considerably decreased cell viability to 75% and 60% (FIG. 7) after incubation for 24 and 48 h, indicating high toxicity of A$\beta_{42}$ fibrils toward PC12 cells. No significant cytotoxicity of Aβ monomer was seen at the concentration of 5-20 μM for less than 24 h of exposure. However, when the incubation time was increased to 48 h, significant cytotoxicity was displayed with 50% of cell death at a concentration of 20 μM. This indicated that the neurotoxic of A$\beta_{42}$ also comes from the growing soluble oligomeric Aβ species, which is consistent with recent mounting evidence. Notably, neuroprotective effects of DNTPH are clearly seen in the cytotoxic activities. Under the incubation with Aβ monomers and fibrils at the ratio of 0.2, the original toxicity of Aβ to neuron cell were largely inhibited. Further confocal imaging showed that DNTPH shows its high selectivity toward Aβ even in the presence of complicated cellular environment. The selectivity was confirmed with ThT labeling, which is previously reported to specifically target on the Aβ fibril in vitro. The results from MTT assay and confocal imaging suggest that DNTPH is effective for reduction of A$\beta_{42}$ aggregates-induced cytotoxicity by targeting and inhibiting the Aβ fibril.

Example 7—Ex Vivo and In Vivo Imaging and Mapping with Aβ Plaques

To further explore the potential clinical applications of DNTPH, its feasibility to pass through the BBB of live animals and to in vivo imaging of the Aβ plaque in transgenic mice was demonstrated (FIGS. 8 and 9). Tail vein injection and brain immersion with DNTPH were performed in non-transgenic and transgenic mice of 6-month of age, which have initially shown human Aβ plaque developed in the brain. As shown in FIG. 9, strong fluorescence signals were centralized in the brain compartments and could be captured very efficiently. In particular, the fluorescence intensity of DNTPH in the brain regions of the APP/PS1 mice was much higher than that in the control of wild-type mice at only 30 min after post-injection, indicative of specifically trapping Aβ plaques in vivo with probe DNTPH. In addition, a histological study was carried out to evaluate the influence of the AIEgens on living mice. Fluorescence imaging of organs removed from APP/PS1 mice and wild type mice reveals that no noticeable damage or inflammatory lesions are observed in the major organs (brain, heart, lung, liver, spleen, and kidney) of the mice after treating with AIEgens, suggesting good biocompatibility (FIG. 10).

What is claimed is:

1. An aggregation-induced emission luminogen (AIEgen) having a Formula 1:

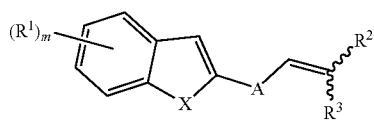

or a pharmaceutically acceptable salt thereof, wherein:
m is a whole number selected from 1-4;
n for each instance is a whole number selected from 1-6;
p is a whole number selected from 1-4;
q is a whole number selected from 2-6;
A is a bond or a moiety having the structure:

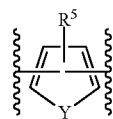

Y is O, S, or $-NR^6-$;
X is $-O(C=O)-$ or $-(R^4)C=C(R^4)-$;
$R^1$ for each instance is independently hydrogen, halide, cyano, nitro, $-OR^7$, $-SR^7$, $-N(R^7)_2$, $-(C=O)R^7$, $-(C=O)OR^7$, $-(C=O)N(R^7)_2$, $-N(R^7)(C=O)R^7$, $-O(C=O)R^7$, $-N(R^7)(C=O)OR^7$, $-O(C=O)N(R^7)_2$, $-SO_2R^7$, $-SO_2N(R^7)_2$, alkyl, cycloalkyl, alkenyl, alkynyl, aryl, aralkyl, heterocycloalkyl, heteroaryl, or $-(CH_2)_nZ$;
$R^2$ is a moiety having structure:

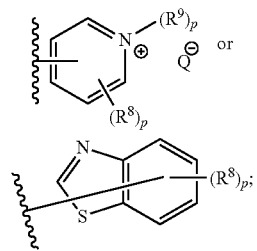

$R^3$ is hydrogen or cyano;
$R^3$ for each instance is independently hydrogen, alkyl, cycloalkyl, alkenyl, alkynyl, aryl, aralkyl, heterocycloalkyl, or heteroaryl;
$R^5$ is hydrogen, halide, cyano, nitro, $-OR^7$, $-SR^7$, $-N(R^7)_2$, $-(C=O)R^7$, $-(C=O)OR^7$, $-(C=O)N(R^7)_2$, $-N(R^7)(C=O)R^7$, $-O(C=O)R^7$, $-N(R^7)(C=O)OR^7$, $-O(C=O)N(R^7)_2$, $-SO_2R^7$, $-SO_2N(R^7)_2$, alkyl, cycloalkyl, alkenyl, alkynyl, aryl, aralkyl, heterocycloalkyl, heteroaryl, or $-(CH_2)_nZ$;
$R^6$ is hydrogen, alkyl, cycloalkyl, alkenyl, alkynyl, aryl, aralkyl, heterocycloalkyl, or heteroaryl;
$R^7$ for each occurrence is independently hydrogen, alkyl, cycloalkyl, alkenyl, alkynyl, aryl, aralkyl, heterocycloalkyl, heteroaryl, or $-(CH_2)_2Z$; or two instances of $R^7$ taken together with the atom or atoms to which they are covalently bonded form a 3-7 membered cycloalkyl, or 3-7 membered heterocycloalkyl;
$R^8$ for each instance is independently hydrogen, halide, cyano, nitro, $-OR^7$, $-SR^7$, $-N(R^7)_2$, $-(C=O)R^7$, $-(C=O)OR^7$, $-(C=O)N(R^7)_2$, $-N(R^7)(C=O)R^7$, $-O(C=O)R^7$, $-N(R^7)(C=O)OR^7$, $-O(C=O)N(R^7)_2$, $-SO_2R^7$, $-SO_2N(R^7)_2$, alkyl, cycloalkyl, alkenyl, alkynyl, aryl, aralkyl, heterocycloalkyl, heteroaryl, or $-(CH_2)_nZ$;
$R^9$ is alkyl, cycloalkyl, alkenyl, alkynyl, aryl, aralkyl, heterocycloalkyl, heteroaryl, $-(CH_2)_qOH$, or $-(CH_2)_qNH_2$; Q is an anion; and
Z for each instance is independently halide, $-C\equiv CH$, $-N_3$, $-NCS$, $-NCO$, $-OR^7$, $-SR^7$, $-N(R^7)_2$, $-(C=O)R^7$, $-(C=O)OR^7$, $-(C=O)N(R^7)_2$, $-N(R^7)(C=O)R^7$, $-O(C=O)R^7$, $-N(R^7)(C=O)OR^7$, $-O(C=O)N(R^7)_2$, $-SO_2R^7$, $-SO_2N(R^7)_2$, or N-maleimide.

2. The AIEgen of claim 1, wherein each of m and t is independently 1 or 2.

3. The AIEgen of claim 1, wherein Y is O or S; and each $R^4$ is hydrogen.

4. The AIEgen of claim 1, wherein A is a bond or a moiety having the structure:

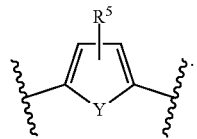

5. The AIEgen of claim 1, wherein m is 1; and $R^1$ is $-OR^7$, $-SR^7$, or $-N(R^7)_2$, wherein $R^7$ for each instance is independently hydrogen, alkyl, cycloalkyl, alkenyl, alkynyl, aryl, aralkyl, heterocycloalkyl, heteroaryl, or $-(CH_2)_nOH$; or two instances of $R^7$ taken together with the nitrogen to which they are covalently bonded form 3-7 membered heterocycloalkyl.

6. The AIEgen of claim 1, wherein $R^2$ is a moiety having structure:

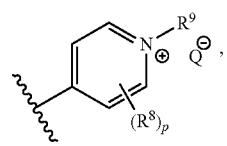

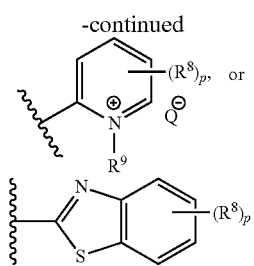

wherein p is 1.

7. The AIEgen of claim 1, wherein the AIEgen is represented by the Formula 2:

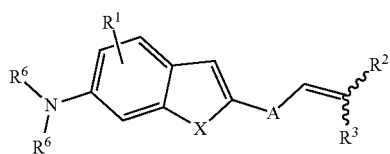

or a pharmaceutically acceptable salt thereof, wherein:
n for each instance is a whole number selected from 1-6;
q is a whole number selected from 2-6;
X is —O(C═O)— or —(H)C═C(H)—;
A is a bond or a moiety having the structure:

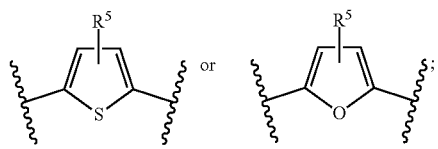

$R^1$ for each instance is independently hydrogen, halide, cyano, nitro, alkyl, cycloalkyl, alkenyl, alkynyl, aryl, aralkyl, heterocycloalkyl, heteroaryl, or —$(CH_2)_nZ$;
$R^2$ is a moiety having structure:

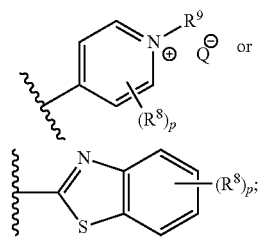

$R^3$ is hydrogen or cyano;
$R^5$ is hydrogen, halide, cyano, nitro, alkyl, cycloalkyl, alkenyl, alkynyl, aryl, aralkyl, heterocycloalkyl, heteroaryl, or —$(CH_2)_nZ$;
$R^7$ for each occurrence is independently hydrogen, alkyl, cycloalkyl, alkenyl, alkynyl, aryl, aralkyl, heterocycloalkyl, heteroaryl, or —$(CH_2)_2Z$; or two instances of $R^7$ taken together with the nitrogen to which they are covalently bonded form a 3-7 membered heterocycloalkyl;
$R^8$ is hydrogen, halide, cyano, nitro, alkyl, cycloalkyl, alkenyl, alkynyl, aryl, aralkyl, heterocycloalkyl, heteroaryl, or —$(CH_2)_nZ$;

$R^9$ is alkyl, cycloalkyl, alkenyl, alkynyl, aryl, aralkyl, heterocycloalkyl, heteroaryl, —$(CH_2)_qOH$, or —$(CH_2)_qNH_2$; and Q is an anion.

8. The AIEgen of claim 7, wherein each of $R^1$, $R^5$, and $R^8$ is hydrogen.

9. The AIEgen of claim 8, wherein $R^7$ for each occurrence is independently hydrogen, alkyl, or —$(CH_2)_nOH$; or two instances of $R^7$ taken together with the nitrogen to which they are covalently bonded form a 3-6 membered heterocycloalkyl.

10. The AIEgen of claim 9, wherein $R^9$ is —$(CH_2)_qOH$ or —$(CH_2)_qNH_2$.

11. The AIEgen of claim 1, wherein the AIEgen is selected from the group consisting of:

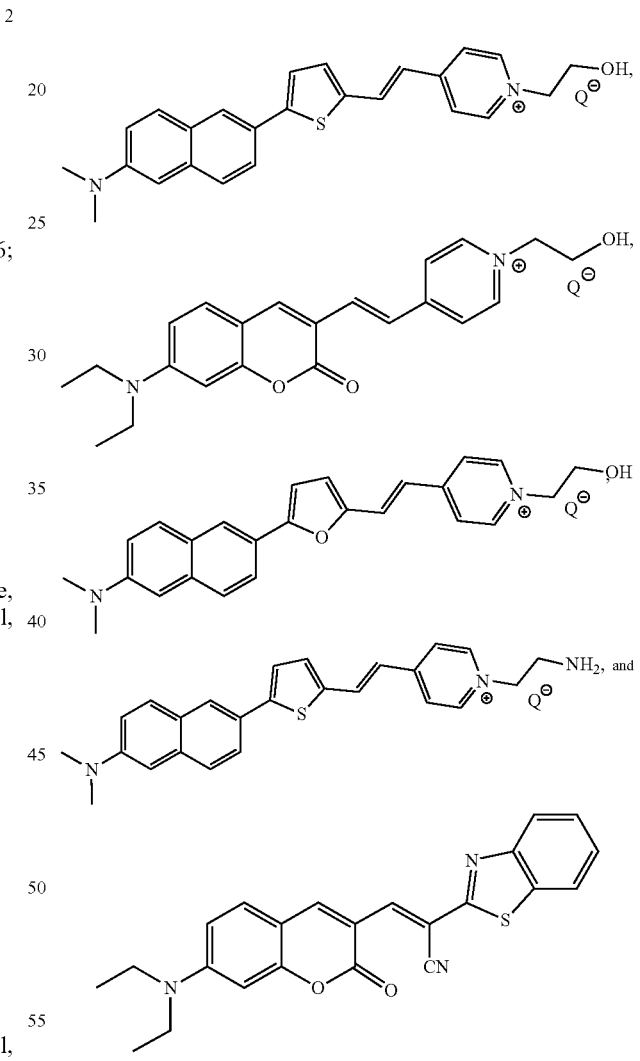

or a pharmaceutically acceptable salt thereof, wherein Q is an anion.

12. A pharmaceutical composition comprising an AIEgen of claim 1 and at least one pharmaceutically acceptable excipient or carrier.

13. A method of preparing an AIEgen of claim 1, the method comprising:
contacting a compound having Formula 6:

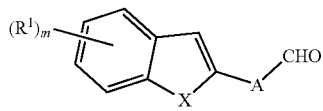

wherein:
m is a whole number selected from 1-4;
n for each instance is a whole number selected from 1-6;
A is a bond or a moiety having the structure:

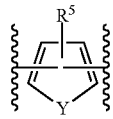

Y is O, S, or —NR$^6$—;
X is —O(C=O)— or —(R$^4$)C=C(R$^4$)—;
R$^1$ for each instance is independently hydrogen, halide, cyano, nitro, —OR$^7$, —SR$^7$, —N(R$^7$)$_2$, —(C=O)R$^7$, —(C=O)OR$^7$, —(C=O)N(R$^7$)$_2$, —N(R$^7$)(C=O)R$^7$, —O(C=O)R$^7$, —N(R$^7$)(C=O)OR$^7$, —O(C=O)N(R$^7$)$_2$, —SO$_2$R$^7$, —SO$_2$N(R$^7$)$_2$, alkyl, cycloalkyl, alkenyl, alkynyl, aryl, aralkyl, heterocycloalkyl, heteroaryl, or —(CH$_2$)$_n$Z;
R$^4$ for each instance is independently hydrogen, alkyl, cycloalkyl, alkenyl, alkynyl, aryl, aralkyl, heterocycloalkyl, or heteroaryl;
R$^5$ is hydrogen, halide, cyano, nitro, —OR$^7$, —SR$^7$, —N(R$^7$)$_2$, —(C=O)R$^7$, —(C=O)OR$^7$, —(C=O)N(R$^7$)$_2$, —N(R$^7$)(C=O)R$^7$, —O(C=O)R$^7$, —N(R$^7$)(C=O)OR$^7$, —O(C=O)N(R$^7$)$_2$, —SO$_2$R$^7$, —SO$_2$N(R$^7$)$_2$, alkyl, cycloalkyl, alkenyl, alkynyl, aryl, aralkyl, heterocycloalkyl, heteroaryl, or —(CH$_2$)$_n$Z;
R$^6$ is hydrogen, alkyl, cycloalkyl, alkenyl, alkynyl, aryl, aralkyl, heterocycloalkyl, or heteroaryl;
R$^7$ for each occurrence is independently hydrogen, alkyl, cycloalkyl, alkenyl, alkynyl, aryl, aralkyl, heterocycloalkyl, heteroaryl, or —(CH$_2$)$_n$Z; or two instances of R$^7$ taken together with the atom or atoms to which they are covalently bonded form a 3-7 membered cycloalkyl, or 3-7 membered heterocycloalkyl; and
Z for each instance is independently halide, —C≡CH, —N$_3$, —NCS, —NCO, —OR$^6$, —SR$^6$, —N(R$^6$)$_2$, —(C=O)R$^6$, —(C=O)OR$^6$, —(C=O)N(R$^6$)$_2$, —N(R$^6$)(C=O)R$^6$, —O(C=O)R$^6$, —N(R$^6$)(C=O)OR$^6$, —O(C=O)N(R$^6$)$_2$, —SO$_2$R$^6$, —SO$_2$N(R$^6$)$_2$, or N-maleimide;
with a secondary amine and a compound of Formula 7a, 7b, or 7c:

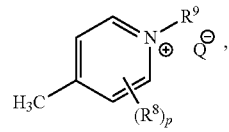

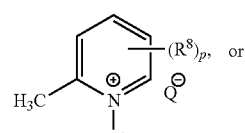

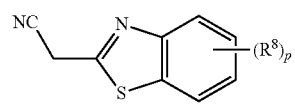

or a conjugate base thereof, wherein
p is a whole number selected from 1-4;
R$^8$ for each instance is independently hydrogen, halide, cyano, nitro, —OR$^7$, —SR$^7$, —N(R$^7$)$_2$, —(C=O)R$^7$, —(C=O)OR$^7$, —(C=O)N(R$^7$)$_2$, —N(R$^7$)(C=O)R$^7$, —O(C=O)R$^7$, —N(R$^7$)(C=O)OR$^7$, —O(C=O)N (R$^7$)$_2$, —SO$_2$R$^7$, —SO$_2$N(R$^7$)$_2$, alkyl, cycloalkyl, alkenyl, alkynyl, aryl, aralkyl, heterocycloalkyl, heteroaryl, or —(CH$_2$)$_n$Z;
R$^9$ is alkyl, cycloalkyl, alkenyl, alkynyl, aryl, aralkyl, heterocycloalkyl, heteroaryl, —(CH$_2$)$_q$OH, or —(CH$_2$)$_q$NH$_2$; and Q is an anion;
thereby forming the AIEgen having Formula 1.

14. A method of imaging a β-amyloid peptide, the method comprising contacting the β-amyloid peptide with an AIEgen of claim 1; irradiating the AIEgen with electromagnetic radiation; and detecting luminescence from the AIEgen.

15. The method of claim 14, wherein the β-amyloid protein comprises Aβ$_{42}$.

16. The method of claim 14, wherein the method is conducted in vivo or ex vivo.

17. The method of claim 14, wherein the AIEgen exhibits λ$_{em}$ emission wavelength maximum between 690-705 nm.

18. The method of claim 14, wherein the AIEgen exhibits a signal-to-noise ratio (S/N) of 10-15-fold.

19. A method of at least partially inhibiting Aβ fibrillogenesis the method comprising contacting Aβ peptides with an AIEgen of claim 1 thereby at least partially inhibiting Aβ fibrillogenesis.

20. A method of treating Alzheimer's disease in a subject in need thereof, the method comprising: administering a therapeutically effective amount of an AIEgen of claim 1 to the subject.

* * * * *